(12) United States Patent
Awatsu

(10) Patent No.: US 11,843,573 B2
(45) Date of Patent: Dec. 12, 2023

(54) CONTROL DEVICE AND NON-TRANSITORY COMPUTER READABLE MEDIUM STORING CONTROL PROGRAM

(71) Applicant: FUJIFILM Business Innovation Corp., Tokyo (JP)

(72) Inventor: Yusaku Awatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 596 days.

(21) Appl. No.: 16/513,721

(22) Filed: Jul. 17, 2019

(65) Prior Publication Data
US 2020/0236228 A1    Jul. 23, 2020

(30) Foreign Application Priority Data

Jan. 18, 2019   (JP) .................................. 2019-006781

(51) Int. Cl.
| | |
|---|---|
| *H04L 51/52* | (2022.01) |
| *H04L 51/216* | (2022.01) |
| *H04L 51/18* | (2022.01) |
| *H04L 51/046* | (2022.01) |
| *H04L 51/02* | (2022.01) |
| *H04L 51/56* | (2022.01) |

(52) U.S. Cl.
CPC .............. *H04L 51/52* (2022.05); *H04L 51/02* (2013.01); *H04L 51/046* (2013.01); *H04L 51/18* (2013.01); *H04L 51/216* (2022.05); *H04L 51/56* (2022.05)

(58) Field of Classification Search
None
See application file for complete search history.

(56) References Cited

U.S. PATENT DOCUMENTS

| | | | |
|---|---|---|---|
| 8,626,755 B2* | 1/2014 | Shiota | G06F 16/58 707/724 |
| 9,167,127 B2 | 10/2015 | Takada et al. | |
| 10,255,348 B2 | 4/2019 | Sato | |
| 2002/0178411 A1* | 11/2002 | Kohda | H04L 43/50 375/213 |

(Continued)

FOREIGN PATENT DOCUMENTS

| | | |
|---|---|---|
| CN | 103248736 | 8/2013 |
| CN | 104361003 | 2/2015 |

(Continued)

OTHER PUBLICATIONS

Akiko Takahashi, "The easiest way to post a collection of stamps and photos on LINE" with English translation thereof, I'll tell you how to solve it! LINE Kakekomi-dera 137th, Oct. 2017, pp. 1-14.

(Continued)

*Primary Examiner* — Lance Leonard Barry
(74) *Attorney, Agent, or Firm* — JCIPRNET

(57) ABSTRACT

A control device includes a first mode in which plural pieces of information posted to a chat are managed for each piece of information and a second mode in which plural pieces of information are collectively managed as one information group includes a control unit that, in a case where plural pieces of information are received, performs control for switching whether to manage the plural pieces of information in the first mode or to manage the plural pieces of information in the second mode.

8 Claims, 22 Drawing Sheets

(56) References Cited

U.S. PATENT DOCUMENTS

| | | | |
|---|---|---|---|
| 2006/0204143 A1* | 9/2006 | Shiota | G06F 16/58 707/E17.026 |
| 2008/0016156 A1* | 1/2008 | Miceli | G06Q 10/10 709/204 |
| 2009/0083716 A1* | 3/2009 | Kimura | G06F 11/3612 717/129 |
| 2009/0237743 A1* | 9/2009 | Hasegawa | H04N 1/3875 358/448 |
| 2014/0351404 A1 | 11/2014 | Li | |
| 2015/0100580 A1 | 4/2015 | Mathur et al. | |
| 2015/0244656 A1* | 8/2015 | Choi | H04L 12/1818 709/206 |
| 2016/0301645 A1* | 10/2016 | Shan | H04L 51/046 |
| 2019/0132710 A1* | 5/2019 | Leach | G06Q 50/01 |

FOREIGN PATENT DOCUMENTS

| | | | |
|---|---|---|---|
| CN | 104519205 | | 4/2015 |
| CN | 107004020 | | 8/2017 |
| EP | 0880271 A2 | * | 11/1998 |
| JP | 2002169847 A | * | 6/2002 |
| JP | 2002305644 | | 10/2002 |
| JP | 2006323449 A | * | 11/2006 |
| JP | 2013103350 | | 5/2013 |
| JP | 2015087998 | | 5/2015 |
| JP | 2016062482 | | 4/2016 |
| JP | 5925373 B1 | * | 5/2016 |
| JP | 6083546 | | 2/2017 |
| JP | 2017045181 | | 3/2017 |
| JP | 2017094743 | | 6/2017 |
| KR | 2006029494 A | * | 4/2006 |
| KR | 101695917 B1 | * | 12/2017 |
| RU | 2599958 C2 | * | 10/2016 |
| WO | 2015183043 | | 12/2015 |
| WO | 2016093552 | | 6/2016 |

OTHER PUBLICATIONS

Tomomi Fujita, "Let's make use of LINE's album function to share images with people you talk to" with English translation thereof, Jan. 2017, pp. 1-8, Available at: https://koneta.nifty.com/koneta_detail/170112000209_1.htm.

"Office Action of Japan Counterpart Application" with English translation thereof, dated Sep. 27, 2022, p. 1-p. 7.

He Jiehui, "Research on Instant Messaging File Transfer Based on Web Front-End Development," with English abstract thereof, Microcomputer Applications, vol. 34, No. 11, Nov. 2018, pp. 88-91, 106.

Jason Bengel et al., "ChatTrack: Chat Room Topic Detection Using Classification," Lecture Notes in Computer Science, 2nd Symposium on Intelligence and Security Informatics (ISI 2004), vol. 3073, Mar. 2004, pp. 1-11.

"Office Action of China Counterpart Application" with English translation thereof, dated Nov. 29, 2022, pp. 1-21.

"Notice of Reasons for Refusal of Japan Counterpart Application", dated Feb. 28, 2023, with English translation thereof, p. 1-p. 5.

"Office Action of Japan Counterpart Application", dated Aug. 8, 2023, with English translation thereof, p. 1-p. 6.

* cited by examiner

FIG. 25
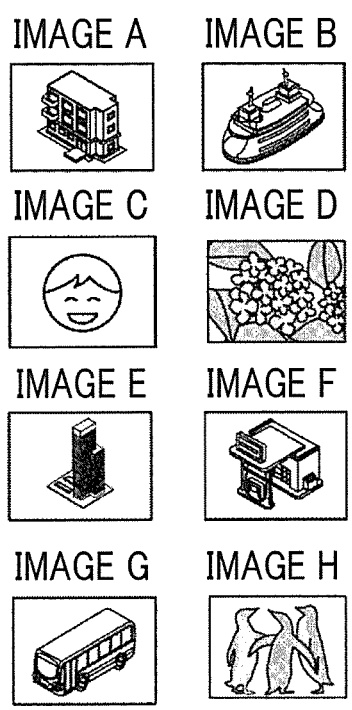
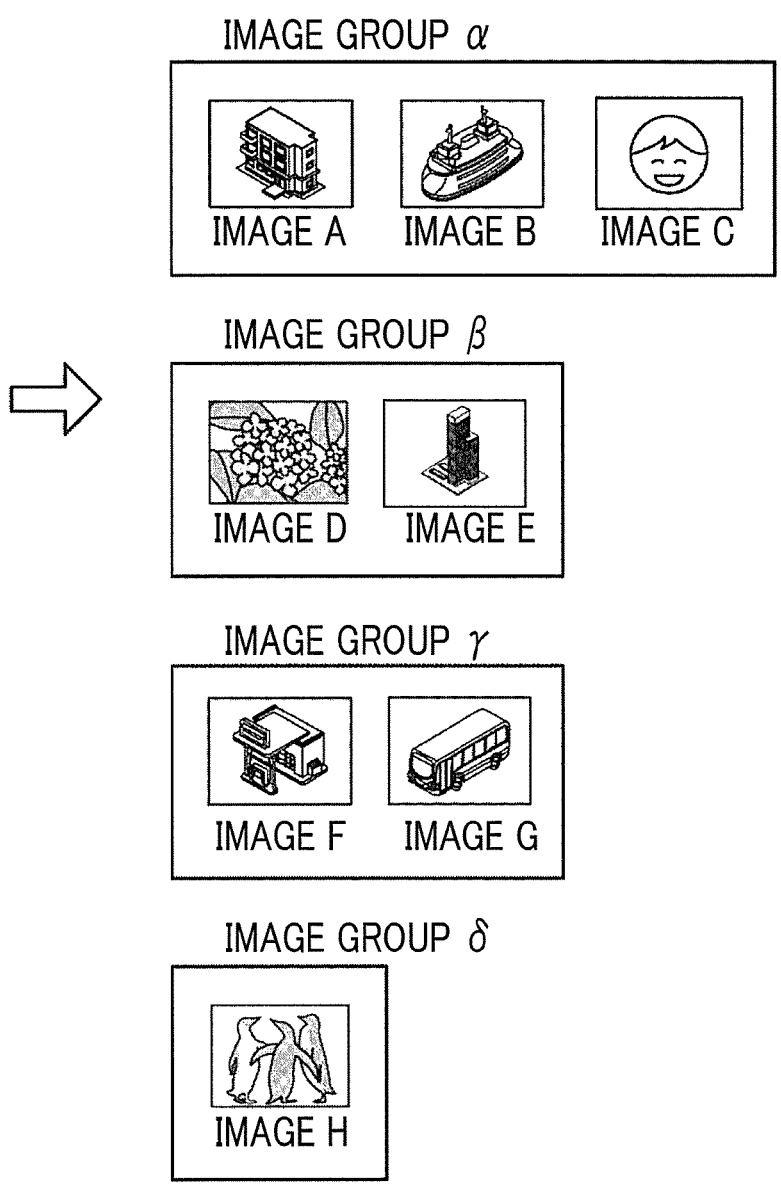

CONTROL DEVICE AND NON-TRANSITORY COMPUTER READABLE MEDIUM STORING CONTROL PROGRAM

CROSS-REFERENCE TO RELATED APPLICATIONS

This application is based on and claims priority under 35 USC 119 from Japanese Patent Application No. 2019-006781 filed Jan. 18, 2019.

BACKGROUND

(i) Technical Field

The present invention relates to a control device and a non-transitory computer readable medium storing a control program.

(ii) Related Art

A service has been developed that registers information in a server using a social networking service (SNS), downloads registered information from the server as necessary, and executes predetermined specific processing on the downloaded information.

JP2017-045181A discloses an image processing apparatus that performs processing for creating an album based on information of an SNS capable of uploading photos. The image processing apparatus includes: first designation means for receiving a user operation designating the posting time of the SNS; first acquisition means for acquiring image data corresponding to one or more photos, among photos posted to the SNS during the posting time, from a first memory device storing image data of photos of the posting source to the SNS; generation means for generating data for printing the album based on the image data of the one or more photos and a pattern designated by the album creation conditions; and output means for outputting data for printing the album to a printer.

JP2016-062482A discloses a program causing a computer accessible to storage means to function as: acquisition means for acquiring post data including at least a message posted to an SNS and user identification information of a user who has posted the message; registration means for, in a case where image data is included in the post data acquired by the acquisition means, issuing a processing identification number for identifying processing on the image data and registering the processing identification number and the image data in the storage means so as to be associated with each other; and posting means for posting a processing identification notification message including the processing identification number to the SNS so that at least the user who has posted the message is notified of the processing identification number in a case where the processing identification number is issued by the registration means.

SUMMARY

In the case of posting related files to an SNS in association with each other, the related files may be posted collectively at one time. However, among SNSs, there is a service that can post only one file per posting. Therefore, in a case where the user posts a plurality of pieces of information including files in a service that can post only one file per posting, the server side may not be able to determine whether it is better to manage files in association with each other or to manage the files individually. For this reason, each time information is posted, the user inquires of the poster of the information whether or not the posted information needs to be collectively managed, thereby determining the range of the information to be managed.

Aspects of non-limiting embodiments of the present disclosure relate to a control device and a non-transitory computer readable medium storing a control program capable of switching whether to manage information independently or collectively without reducing the operability of a poster involved in information posting compared with a case of inquiring of a poster of information whether or not to manage received information together with other pieces of information each time information is received.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control device having a first mode in which a plurality of pieces of information posted to a chat are managed for each piece of information and a second mode in which a plurality of pieces of information are collectively managed as one information group. The control device includes: a control unit that, in a case where a plurality of pieces of information are received, performs control for switching whether to manage the plurality of pieces of information in the first mode or to manage the plurality of pieces of information in the second mode.

BRIEF DESCRIPTION OF THE DRAWINGS

Exemplary embodiments of the present invention will be described in detail based on the following figures, wherein:

FIG. 25 is a diagram showing an example of classification of information according to the information creation date.

DETAILED DESCRIPTION

Figure 1:
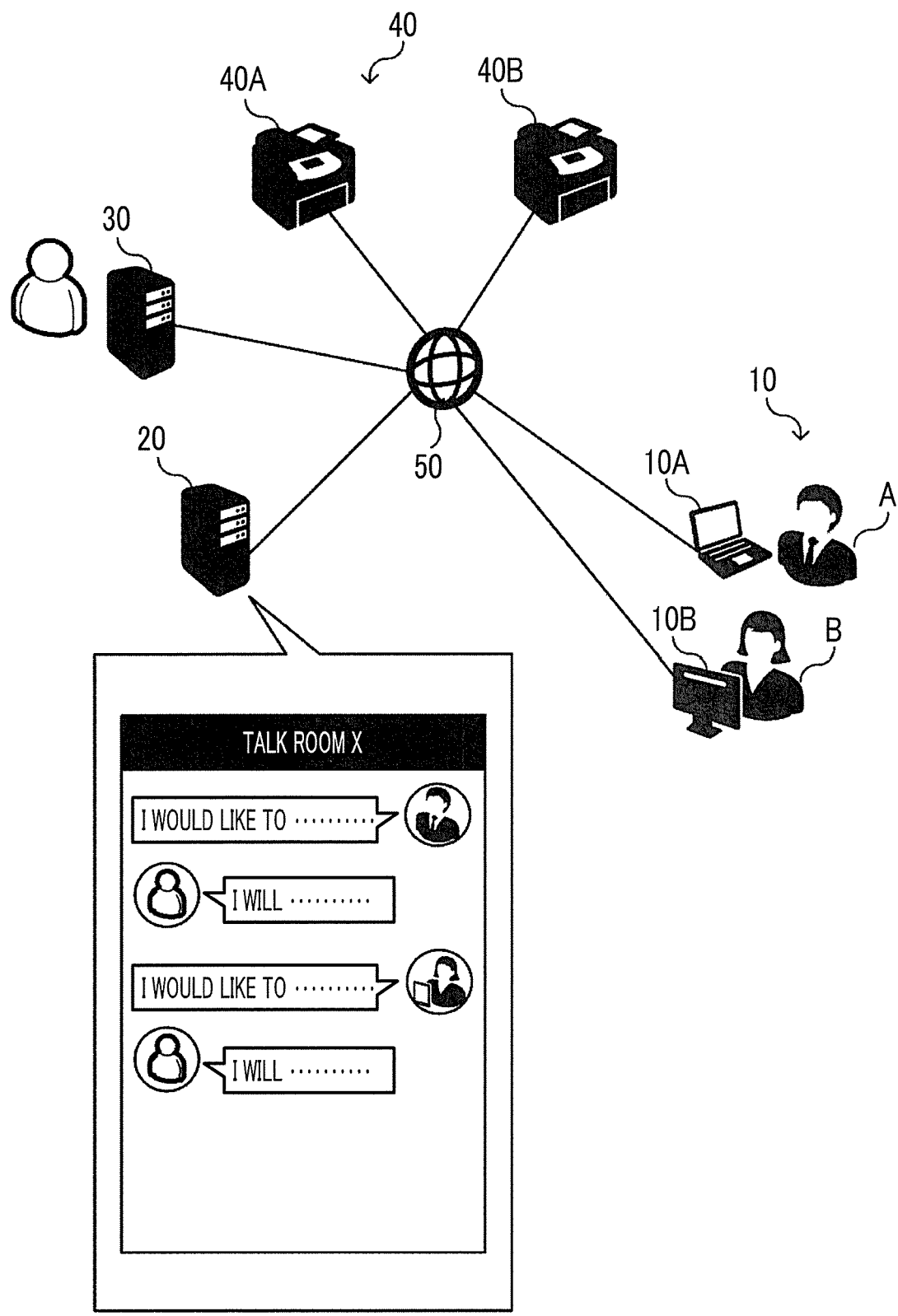
FIG. 1 is a diagram showing an example of the schematic configuration of a control system.

Hereinafter, examples of exemplary embodiments of the present invention will be described with reference to the accompanying drawings. In the drawings, the same or equivalent constituent elements and processes are denoted by the same reference numerals. In addition, the dimensional ratios of the drawings are exaggerated for convenience of explanation and may be different from the actual ratios.

First Exemplary Embodiment

FIG. 1 is a diagram showing an example of the schematic configuration of a control system according to an exemplary embodiment of the present invention.

The control system includes a user terminal 10, a talk room server 20, a control device 30, and an information processing apparatus 40. The user terminal 10, the talk room server 20, the control device 30, and the information processing apparatus 40 are connected to each other by a communication line 50. The control device 30 operates as a chatbot server in a chat performed in a talk room as will be described later.

The user terminal 10 is a terminal used by a user, and may be any terminal, such as a desktop computer, a notebook computer, a tablet, and a smartphone. In FIG. 1, it is assumed that a user A uses a user terminal 10A and a user B uses a user terminal 10B. Hereinafter, the user terminals 10A and 10B will be referred to collectively as the "user terminal 10". For convenience of explanation, only two users of the user A and the user B are shown in FIG. 1. However, one or three or more users may participate in the control system. In this case, the user terminals 10 the number of which corresponds to the number of users are connected to the communication line 50.

The talk room server 20 provides a talk room. The talk room is a virtual space in which at least one user and a chatbot, which will be described later, participate so that information indicated by the file posted by the chat can be shared, and is used as a place to post information.

Here, the "file" is a unit of data indicating certain information, and the "chat" means that a plurality of members input and exchange information on a computer network in real time or an environment therefor. The "member" includes both a user associated with a real person and a software robot that operates according to specific rules. In addition, the "chatbot" is a software robot that performs control to execute specific processing based on information posted by a user on a talk room.

The user posts a file to the talk room through the user terminal 10. Here, "posting a file" means an act of inputting information in a chat. The user who posts a file is also called a "poster".

The information indicated by the file includes, for example, an image or text. The image may be a still image or a moving image. The file may be an audio file. In other words, "posting a file" is an act of inputting various kinds of instructions or information indicated by images, sound, and text in the chat.

In the talk room, users can share information indicated by files, and the chatbot responds to the user's information. In the talk room, the user can give an instruction, which is for causing the information processing apparatus 40 to execute predetermined specific processing, to the chatbot. For example, the chatbot extracts an instruction included in the information indicated by the posted file by natural language processing. In addition, in a case where the type of information indicated by the posted file is an image, the chatbot manages the posted image and controls the information processing apparatus 40 to execute specific processing. A user and a chatbot can participate in a talk room on a one-to-one basis, or a plurality of users and a chatbot can participate in a talk room.

A chat performed by two users participating in a talk room will be referred to as an "individual chat", and a chat performed by three or more users participating in a talk room will be referred to as a "group chat". One of the users participating in a chat may be a chatbot. The following explanation will be given on the assumption that a chatbot participates in the individual chat and the group chat. There can be a plurality of talk rooms as many as opened talk rooms.

The control device 30 controls a chatbot and manages a file posted from the user terminal 10 to the talk room. In a case where a user request is received from the information processing apparatus 40, the control device 30 performs control to execute specific processing in cooperation with the information processing apparatus 40 so that the specific processing is executed on the file to be managed. As described above, the chatbot participates in the talk room and responds to the information indicated by the file posted by the poster.

Although there is no restriction on the type of information indicated by the file posted by the poster, an example of posting an image will be described herein as an example. The image is an example of "information" in the present exemplary embodiment.

The control device 30 acquires an image posted through a chat, and stores and manages the acquired image in a storage device. "Managing an image" refers to controlling the handling of an image such that processing designated by the user, such as acquisition, deletion, and copying of the image, is performed on the image designated by the user. Hereinafter, storing an image in the storage device by the control device 30 may be referred to as "registering an image".

The control device 30 has a first mode in which management of a plurality of images posted to a chat is performed for each image and a second mode in which a plurality of images are collectively managed as one image group.

In a case where the user desires to manage images for each image, the user instructs the control device 30 to register an image in the first mode.

On the other hand, by managing related images collectively, each of the related images can be acquired by one designation. In this case, the operability of the user is improved as compared with a case in which managed images are individually designated to acquire each of the related images. Therefore, in a case where it is necessary for the control device 30 to manage related images collectively, the user instructs the control device 30 to manage images in the second mode. That is, one image is a management unit in the case of the first mode, and a plurality of images are a management unit in the case of the second mode. Hereinafter, the first mode is referred to as "mode 1", and the second mode is referred to as "mode 2".

As will be described later, even in a case where the user does not instructs an image management mode to the control device, the control device 30 may manage images individually or collectively according to criteria on aggregation of images set in advance by the user. The "criteria on aggregation of images" are criteria defining the determination criteria used to determine whether to manage images in mode 1 or mode 2 based on what viewpoints, and will be referred to as "aggregation criteria" hereinafter. The control device 30 corresponds to a plurality of aggregation criteria, and the aggregation criteria used by the control device 30 are changed, for example, in a case where a user gives an instruction through the talk room.

In addition, the control device 30 associates identification information, which is for uniquely identifying a managed image or image group, with each management unit of images and posts the identification information associated with the image or the image group to the user participating in the chat as a response to registration of the image.

The user who has received the identification information through a chat or other users who have received the identification information from the user, for example, through a chat in another talk room give an instruction to start specific processing on the image associated with the input identification information by inputting the identification information to the information processing apparatus 40 to be described later.

The information processing apparatus 40 is an apparatus that performs information processing in cooperation with the control device 30 according to the user's instruction. Examples of the "information processing" include processing for printing and displaying text data, image data, and the like, processing for generating or processing data using materials provided in the information processing apparatus 40, and processing for transmission and reception of data between the information processing apparatus 40 and other apparatuses.

Hereinafter, an example will be described in which the information processing apparatus 40 is an image forming apparatus and the specific processing executed by the information processing apparatus 40 is processing for forming an image managed by the control device 30 on a recording medium, such as paper. However, specific processing is not necessarily limited to the formation of an image. For example, the specific processing may be processing for distributing a file of an image managed by the control device 30 to an apparatus designated by the user.

The processing for forming predetermined information, such as an image managed by the control device 30, on a recording medium so that the user can grasp the content of the information through visual or tactile sense is referred to as "printing". Since the image forming apparatus is an example of the information processing apparatus 40, the image forming apparatus will also be denoted by reference numeral 40 for explanation.

In the example of the control system shown in FIG. 1, an image forming apparatus 40A and an image forming apparatus 40B are connected to the communication line 50. Unless otherwise noted, the image forming apparatus 40A and the image forming apparatus 40B will be referred to collectively as the "image forming apparatus 40". In the example shown in FIG. 1, the image forming apparatus 40 is connected to the control device 30 through the communication line 50. However, the image forming apparatus 40 may also be connected to the control device 30 through a communication line (not shown) different from the communication line 50. Three or more image forming apparatuses 40 may be connected to the communication line 50. There is no restriction on the installation place of the image forming apparatus 40, but as an example, the image forming apparatus 40 is installed at a place where anyone can visit, for example, a store such as a convenience store.

By inputting identification information to any image forming apparatus 40 by the user, an image associated with the identification information is printed on the recording medium.

Next, the hardware configuration of the talk room server 20 and the control device 30 will be described.

Figure 2:
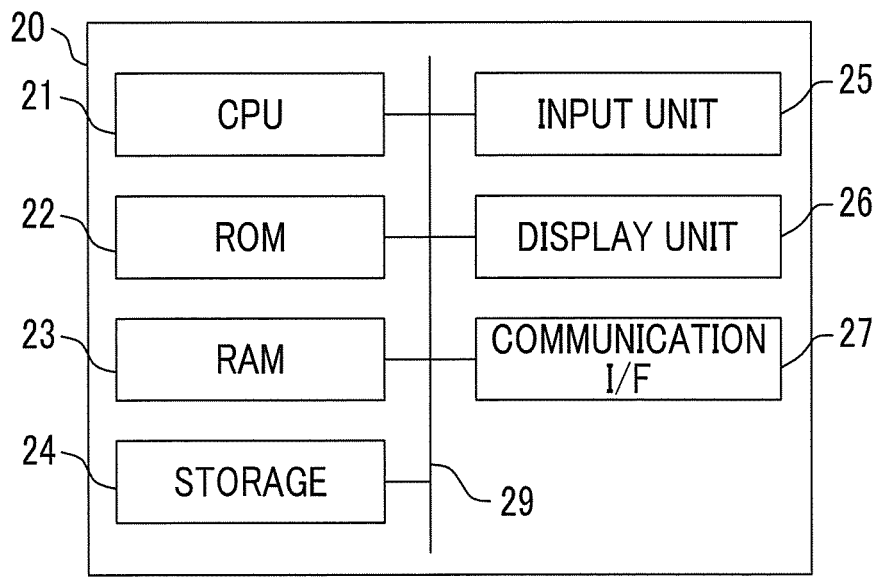
FIG. 2 is a block diagram showing an example of the hardware configuration of a talk room server.

FIG. 2 is a block diagram showing an example of the hardware configuration of the talk room server 20.

As shown in FIG. 2, the talk room server 20 has components of a central processing unit (CPU) 21, a read only memory (ROM) 22, a random access memory (RAM) 23, a storage 24, an input unit 25, a display unit 26, and a communication interface (I/F) 27. The respective components are communicably connected to each other through a bus 29.

The CPU 21 is a central processing unit, and functions as a control unit that executes various programs or controls each unit. That is, the CPU 21 reads a program from the ROM 22 or the storage 24, and executes the program with the RAM 23 as a work area. The CPU 21 performs control and various kinds of arithmetic processing of the above-described components according to the program recorded in the ROM 22 or the storage 24. In the present exemplary embodiment, it is assumed that a talk room providing program for providing a talk room is stored in the ROM 22.

The ROM 22 stores various programs and various kinds of data. The RAM 23 temporarily stores a program or data as a work area. The storage 24 is a hard disk drive (HDD) or a solid state drive (SSD), and stores various programs including an operating system and various kinds of data.

The input unit 25 includes a pointing device, such as a mouse, and a keyboard, and is used to perform various kinds of input.

The display unit 26 includes a display device that displays various kinds of information, such as a liquid crystal display or an organic electro luminescence (EL) display, and displays information processed by the CPU 21. A touch panel type display unit 26 may be used, so that the display unit 26 functions as the input unit 25.

The communication I/F 27 is an interface for communicating with other apparatuses through the communication line 50. For example, standards, such as Ethernet (registered trademark), FDDI, Wi-Fi (registered trademark), and Bluetooth (registered trademark), are used.

Figure 3:
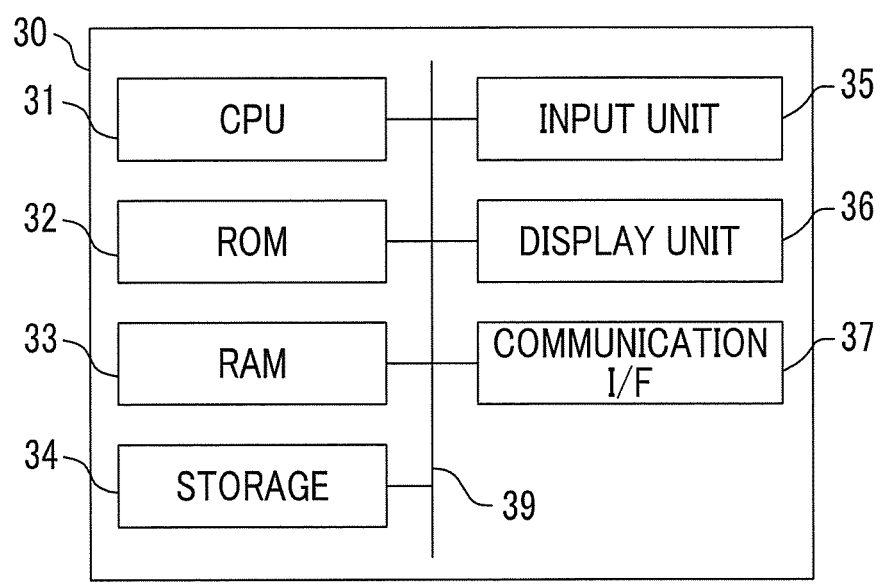
FIG. 3 is a block diagram showing an example of the hardware configuration of a control device.

FIG. 3 is a block diagram showing an example of the hardware configuration of the control device 30.

As shown in FIG. 3, the control device 30 has components of a CPU 31, a ROM 32, a RAM 33, a storage 34, an input unit 35, a display unit 36, and a communication I/F 37. The respective components are communicably connected to each other through a bus 39. Each component of the control device 30 has the same function as each component of the talk room server 20 in FIG. 2.

Next, the functional configuration of the talk room server 20 and the control device 30 will be described.

Figure 4:
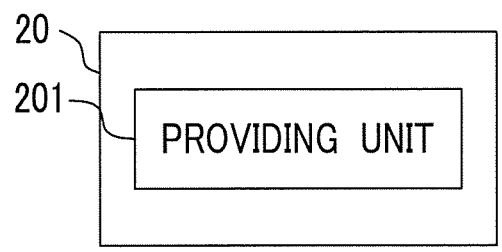
FIG. 4 is a block diagram showing an example of the functional configuration of a talk room server.

FIG. 4 is a block diagram showing an example of the functional configuration of the talk room server 20.

As shown in FIG. 4, the talk room server 20 has a providing unit 201 as a functional configuration. The functional configuration is realized by the CPU 21 that reads a talk room providing program stored in the ROM 22 and loads the talk room providing program to the RAM 23 to execute the talk room providing program.

The providing unit 201 provides a talk room in which a user can participate and post a file. The talk room server 20 provides a talk room in which an individual chat is performed and a talk room in which a group chat is performed using the function of the providing unit 201.

A plurality of talk rooms can be opened according to the opening request from the user. For example, in a case where a certain user accesses the talk room server 20 to make a talk room opening request and opens a specific talk room, the user who is a creator can invite another user to the opened talk room so that the user participates in the opened talk room. Alternatively, a user participating in the talk room can invite another user not participating in the talk room to the talk room so that the user newly participates in the talk room.

Figure 5:
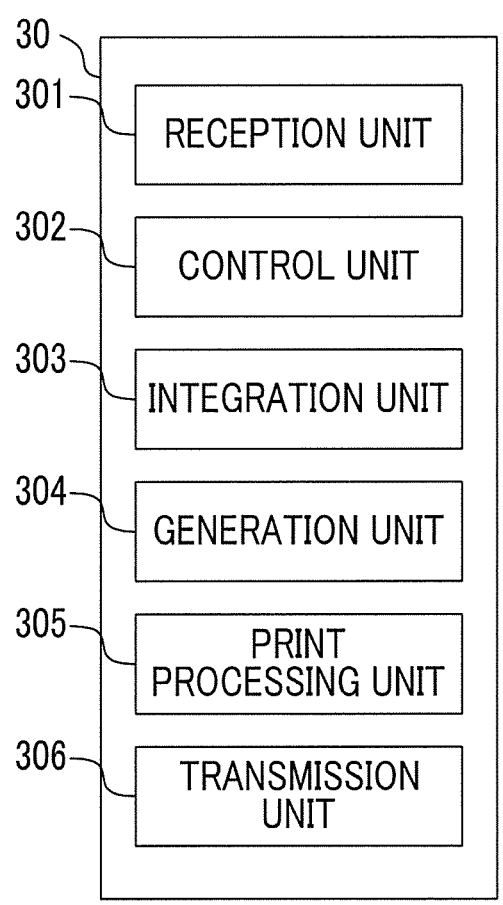
FIG. 5 is a block diagram showing an example of the functional configuration of a control device.

FIG. 5 is a block diagram showing an example of the functional configuration of the control device 30. As shown in FIG. 5, the control device 30 includes functional components of a reception unit 301, a control unit 302, an integration unit 303, a generation unit 304, a print processing unit 305, and a transmission unit 306. The functional components are realized by the CPU 31 that reads a control program stored in the ROM 32 and loads the control program to the RAM 33 to execute the control program.

The reception unit 301 receives various kinds of information from the user terminal 10, the talk room server 20, and the image forming apparatus 40 that are connected to the communication line 50 through the communication I/F 37. The information received by the reception unit 301 includes, for example, an image transmitted by relaying the talk room server 20 from the user terminal 10 and identification information transmitted from the image forming apparatus 40.

The control unit 302 performs switching whether to manage a plurality of images in mode 1 or in mode 2 according to the image aggregation criteria in a case where a plurality of images are received from the talk room server 20. In addition, the control unit 302 controls the operation of the control device 30 by controlling the reception unit 301 and the integration unit 303, the generation unit 304, the print processing unit 305, and the transmission unit 306, which will be described later, according to the content defined by the control program.

The integration unit 303 integrates a plurality of images managed in mode 2 into one image group in a case where the image management mode is switched to mode 2 by the control unit 302.

The generation unit 304 generates identification information uniquely associated with each management unit of images. The management unit of images managed in mode 1 is each image, and the management unit of images managed in mode 2 is an image group in which a plurality of images are collected.

In a case where the identification information generated by the generation unit 304 is received by the reception unit 301, the print processing unit 305 performs processing so that the image forming apparatus 40, which is a transmission source of the identification information, performs processing for printing an image or an image group associated with the identification information, which is an example of the specific processing.

The transmission unit 306 transmits various kinds of information including the identification information to the user terminal 10 used by the poster who has posted the image, and transmits an image or an image group associated with the received identification information to the image forming apparatus 40.

Figure 6:
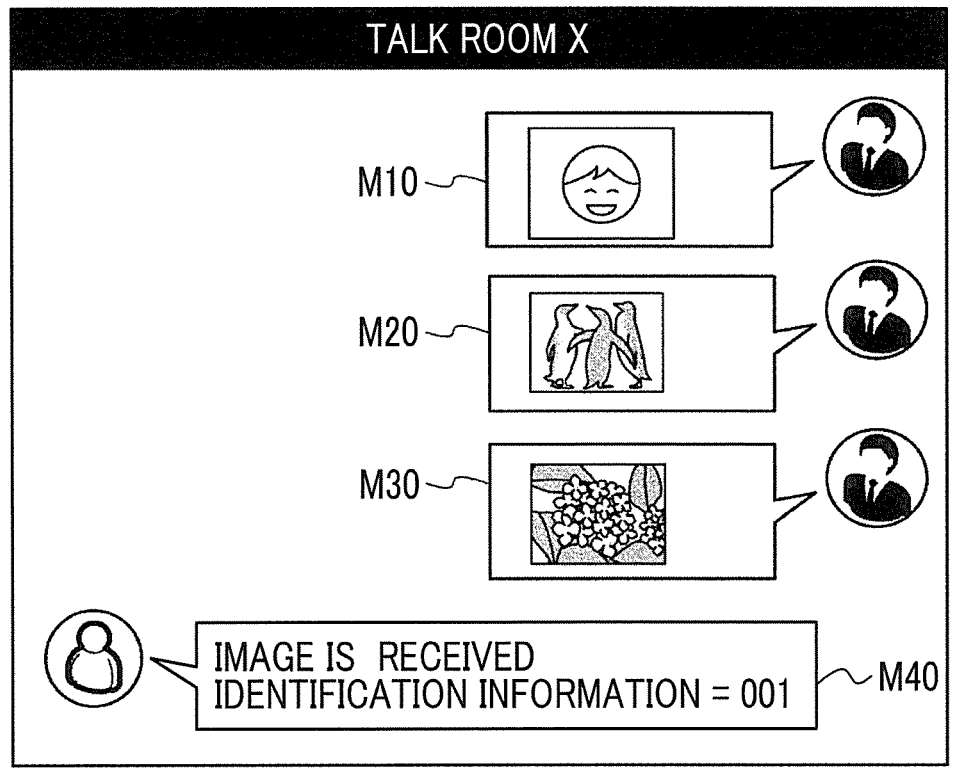
FIG. 6 is a diagram showing an example of posting of an image in a talk room.

FIG. 6 is a diagram showing an example of posting an image in a talk room, and shows a situation in which a poster posts each image with information M10, M20, and M30 and a chatbot receives each image.

In a case where a plurality of images are posted, the control device 30 performs control for switching whether to manage the plurality of images in mode 1 or in mode 2 according to the image aggregation criteria. Then, the control device 30 generates identification information for each management unit of images according to the image management mode, and posts the identification information to the poster of the image through the chatbot. In the example shown in FIG. 6, a situation is shown in which the chatbot posts only one piece of identification information since images included in the information M10, M20, and M30 are collectively managed as one image group.

Next, the operation of the control device 30 according to the present exemplary embodiment will be described in detail.

Figure 7:
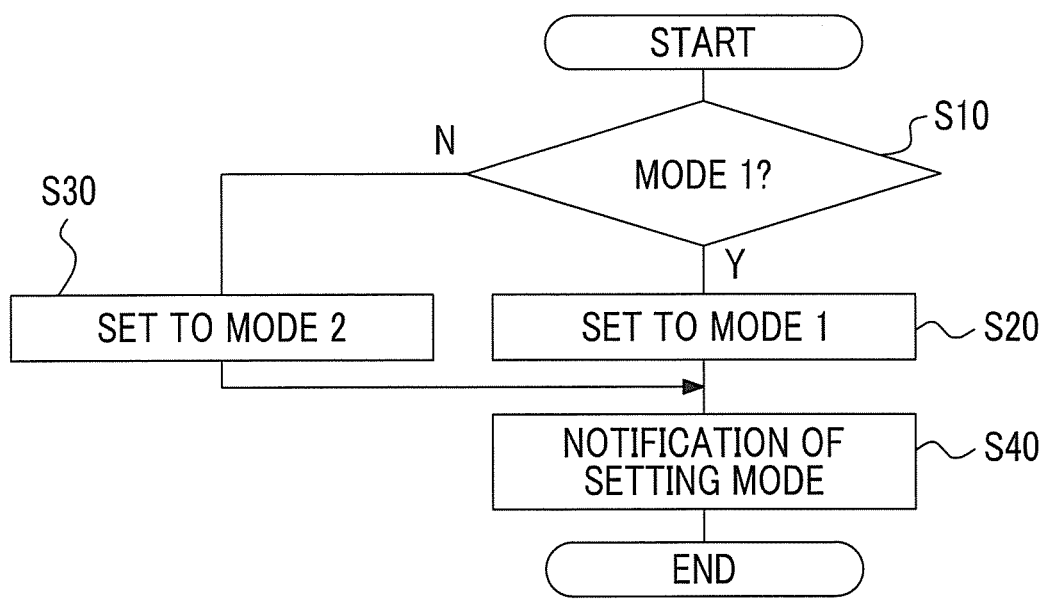
FIG. 7 is a flowchart showing an example of image management mode setting processing.

FIG. 7 is a flowchart showing an example of image management mode setting processing executed by the CPU 31 in a case where a mode designation, which is for designating an image management mode from the poster of an image through a talk room, is received.

A control program defining the image management mode setting processing shown in FIG. 7 is stored in advance in the ROM 32 of the control device 30, for example. The CPU 31 of the control device 30 reads the control program stored in the ROM 32 to execute the image management mode setting processing.

In step S10, the CPU 31 determines whether or not the received mode designation is a designation in which mode 1 is designated as the image management mode. In a case where mode 1 is designated, the process proceeds to step S20. In step S20, the CPU 31 sets the image management mode to mode 1.

On the other hand, in a case where the received mode designation is not a designation in which mode 1 is designated as the image management mode, that is, in a case where mode 2 is designated, the process proceeds to step S30. In step S30, the CPU 31 sets the image management mode to mode 2.

After executing step S20 or step S30, in step S40, the CPU 31 posts the set management mode to the talk room through the chatbot, and notifies the poster who has performed posting for mode designation of the image management mode set in the control device 30. As described above, the image management mode setting processing shown in FIG. 7 is ended.

In this manner, the control device 30 receives designation of the image management mode from the user.

In a case where the image management mode is set to mode 2, the control device 30 collectively manages a plurality of images posted to the talk room. However, the aggregation range of images to be collected as one image group changes according to the image aggregation criteria. The control device 30 corresponds to the aggregation criteria of a plurality of images, and the user posts image aggregation criteria to be applied to the talk room as in mode designation, so that image aggregation criteria to be used in the control device 30 are set. Hereinafter, an image aggregation method according to various aggregation criteria will be described.

Figure 8:
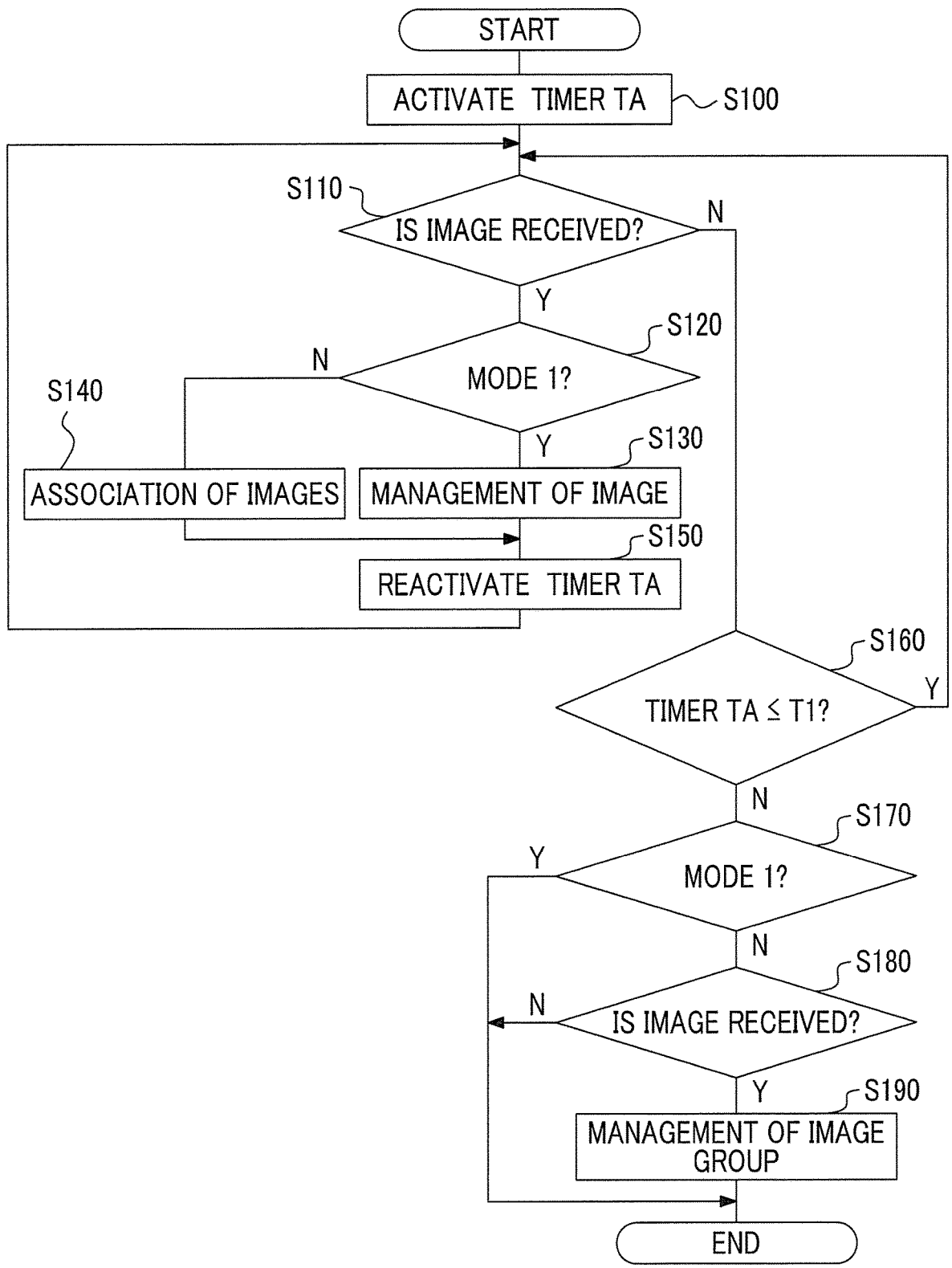
FIG. 8 is a flowchart showing an example of image management processing.

FIG. 8 is a flowchart showing an example of image management processing executed according to aggregation criteria in which an image aggregation range is defined by the image posting time. Specifically, FIG. 8 shows image management processing according to aggregation criteria for determining the image aggregation range based on the image posting interval.

The image management processing shown in FIG. 8 is executed after the image management mode setting processing shown in FIG. 7 is performed. A control program defining the image management processing shown in FIG. 8 is stored in advance in the ROM 32 of the control device 30, for example. The CPU 31 of the control device 30 reads the control program stored in the ROM 32 to execute the image management processing shown in FIG. 8.

In step S100, the CPU 31 activates a timer TA for measuring an image posting interval. For example, a timer function built in the CPU 31 is used as the timer TA, but the CPU 31 may use a timer function provided in an external apparatus (not shown) connected to the communication line 50 through the communication I/F 37. By activating the timer TA, an elapsed time from the point in time at which the timer TA is activated is measured.

In step S110, the CPU 31 determines whether or not an image has been received through the talk room. In a case where no image is received, the process proceeds to step S160.

In step S160, the CPU 31 determines whether or not the value of the timer TA is equal to or less than the time T1. The time T1 is a value indicating the upper limit time of the image posting interval, and is stored, for example, in the storage 34 in advance. The time T1 can be changed, for example, by the user who performs posting for designating the value of the time T1 to the talk room.

The upper limit time of the image posting interval is the upper limit time to wait for the reception of the next image. In a case where the image management mode is mode 2, the CPU 31 determines that the posting of images by the poster has ended in a case where the posting interval until the next image is posted exceeds the time T1. Therefore, in a case where the value of the timer TA is equal to or less than the time T1, the process proceeds to step S110. The CPU 31 monitors the posting of an image from the user by repeatedly executing steps S110 and S160 until the value of the timer TA exceeds the time T1.

In a case where it is determined that an image has been received in the determination processing of step S110, the process proceeds to step S120.

In step S120, the CPU 31 determines whether or not the image management mode is set to mode 1. In a case where the image management mode is set to mode 1, the process proceeds to step S130.

In a case where the image management mode is mode 1, the received images are individually managed. Therefore, in step S130, the CPU 31 independently manages the received image without waiting for an image to be posted to the talk room thereafter. That is, the CPU 31 generates identification information associated with each image. There is no limitation on the storage destination of images to be managed. For example, images to be managed may be stored in an external apparatus different from the control device 30 through the communication I/F 37. However, hereinafter, it is assumed that images to be managed are stored in the storage 34 as an example.

On the other hand, in a case where it is determined that the image management mode is not set to mode 1 in the determination processing of step S120, the process proceeds to step S140.

In this case, since the image management mode is set to mode 2, the received image is combined with images to be received subsequently to form an image group. Therefore, in step S140, the CPU 31 stores the received images in the RAM 33 so as to be associated with each other. In the case of the first received image, there is no image to be associated yet. Accordingly, the first received image is stored in the RAM 33 as it is.

After executing step S130 or step S140, in step S150, the CPU 31 reactivates the timer TA. Then, each time the control device 30 receives an image, the value of the timer TA is returned to "0". After starting to measure the elapsed time from the reception of the image again, the process proceeds to step S110 to monitor the posting of the next image.

That is, in the case of mode 1, even in a case where a plurality of images are posted to the talk room, each image is an image management unit. In the case of mode 2, the next image is waited until the time T1 elapses after an image is posted, and an image posted within the time T1 is stored in the RAM 33 so as to be associated with the already posted image.

On the other hand, in a case where it is determined that the image posting interval exceeds the time T1 in the determination processing of step S160, it is considered that the posting of images by the poster has ended. Therefore, the process proceeds to step S170.

In step S170, the CPU 31 determines whether or not the image management mode is set to mode 1. In a case where the image management mode is set to mode 1, image management is performed each time an image is received in step S130. Therefore, the image management processing shown in FIG. 8 is ended.

In a case where the image management mode is set to mode 2, the process proceeds to step S180.

In step S180, the CPU 31 determines whether or not at least one image has been received in mode 2. Step S180 is determination processing corresponding to a situation in which the timer TA exceeds the time T1 due to no image being posted by the poster even though an image to be posted is waited. In a case where at least one image is received, the process proceeds to step S190. In step S190, the CPU 31 determines and manages the image group, which is stored such that the images are associated with each other in step S140, as one management unit. That is, the CPU 31 generates identification information for the image group managed collectively, and ends the image management processing shown in FIG. 8.

On the other hand, in a case where it is determined that no image has been received in the determination processing of step S180, an image to be managed is not present. Therefore, the image management processing shown in FIG. 8 is ended without executing the processing of step S190.

In the image management processing shown in FIG. 8, in a case where the image management mode is mode 2, a plurality of images are collectively managed in a case where the image posting interval is less than the time T1. However, the control device 30 may set the upper limit value to the number of images to be collectively managed. In a case where the number of images to be collectively managed exceeds the upper limit value, images the number of which is the upper limit value may be managed as one image group, and images exceeding the upper limit value may be managed as new management targets to be collectively managed.

Even in a case where the image management mode is set to mode 2, in a case where only one image is posted and the timer TA exceeds the time T1, identification information is associated with a single image. As a result, management in mode 1 is performed.

Figure 9:
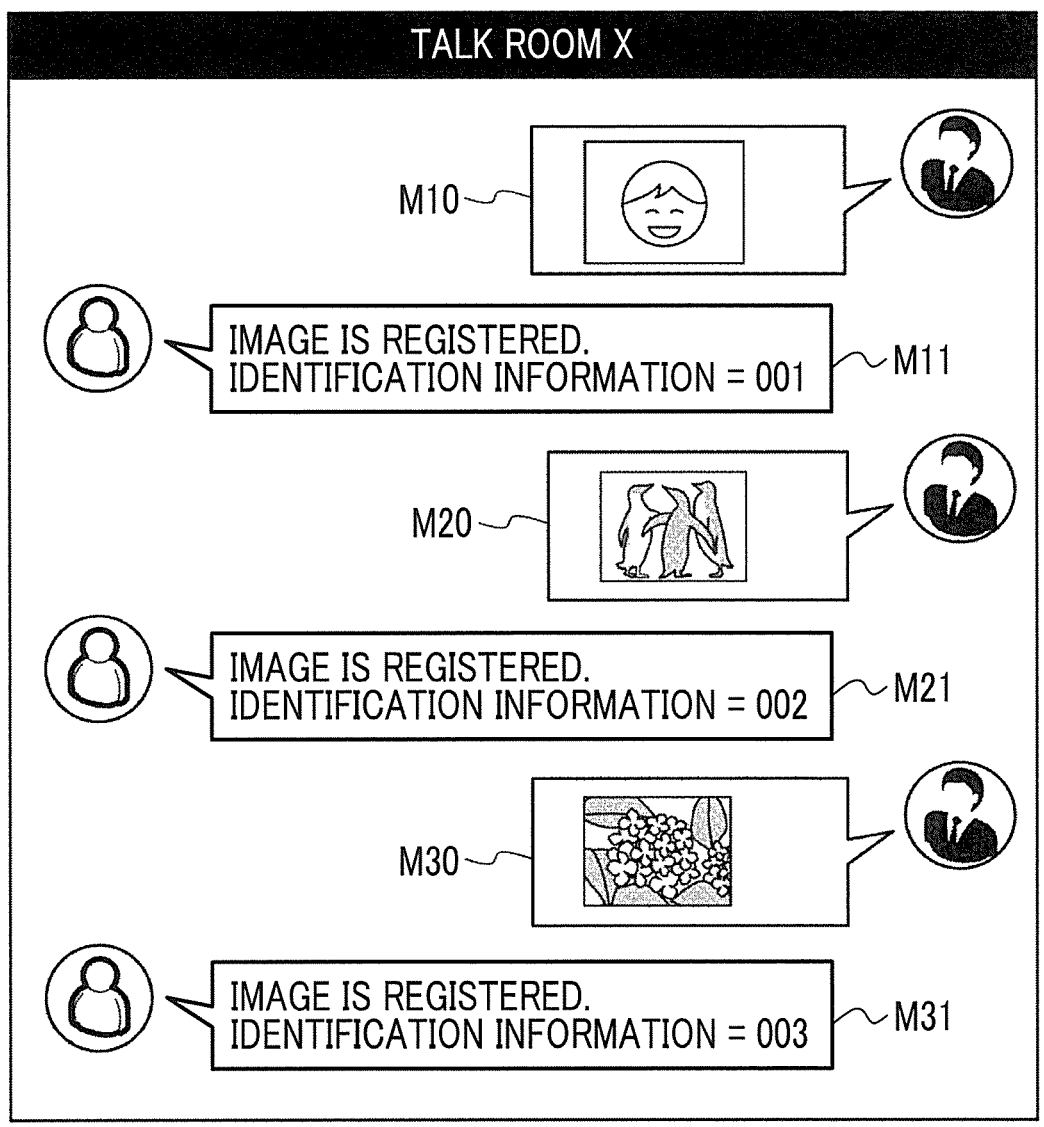
FIG. 9 is a diagram showing a display example of a talk room in a case where the image management mode is set to mode 1.

FIG. 9 is a diagram showing a display example of a talk room in the user terminal 10 in a case where the image management mode is set to mode 1 in the image management processing shown in FIG. 8. In this case, each time an image is posted, a chatbot, that is, the control device 30 registers the image, and posts, to the talk room, the information M11, M21, and M31 for notifying that identification information is managed in association with each image.

Figure 10:
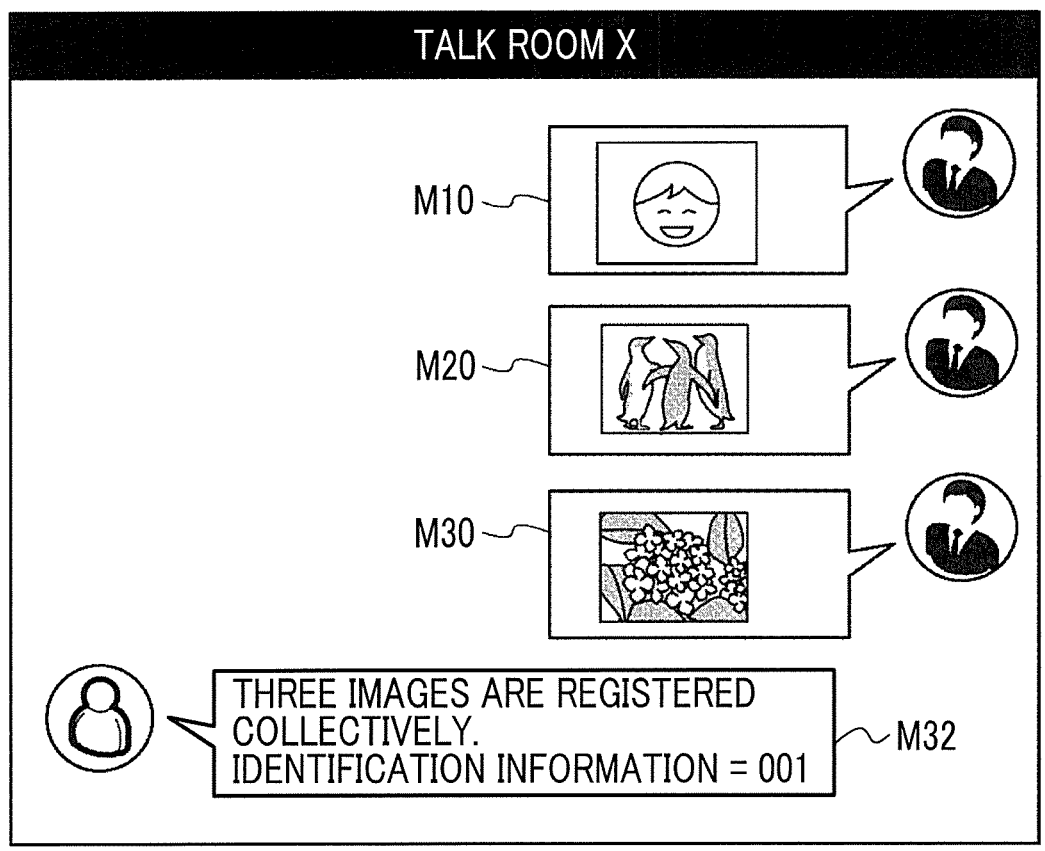
FIG. 10 is a diagram showing a display example of a talk room in a case where the image management mode is set to mode 2.

On the other hand, FIG. 10 is a diagram showing a display example of a talk room in the user terminal 10 in a case where the image management mode is set to mode 2 in the image management processing shown in FIG. 8. In this case, images whose posting interval with the image posted immediately before is within the time T1 are collectively managed. Therefore, in a case where the posting interval of the information M10, M20, and M30 is within the time T1, as shown in FIG. 10, the chatbot posts, to the talk room, information M32 for notifying that the respective images included in the information M10, M20, and M30 have been collectively registered.

As shown in FIG. 7, the control device 30 sets the image management mode to a mode explicitly designated in advance by the user. However, the desired length of waiting time of an image may be designated together with posting of the image. For example, the control device 30 may switch to mode 1 in a case where a designation "do not wait for reception of a subsequent image" is given to the received image and switch to mode 2 in a case where a designation "wait for reception of a subsequent image" is given to the received image. In the case of waiting for the reception of a subsequent image, the user may designate the length of the waiting time. In a case where the length of the waiting time is not designated, the standard time T1 prepared in advance in the control device 30 is used.

In the user terminal 10, the operation of the image selection screen in a case where the user posts an image to the talk room is made different between the case where the user sets the image management mode to mode 1 and the case where the user sets the image management mode to mode 2.

Figure 11:
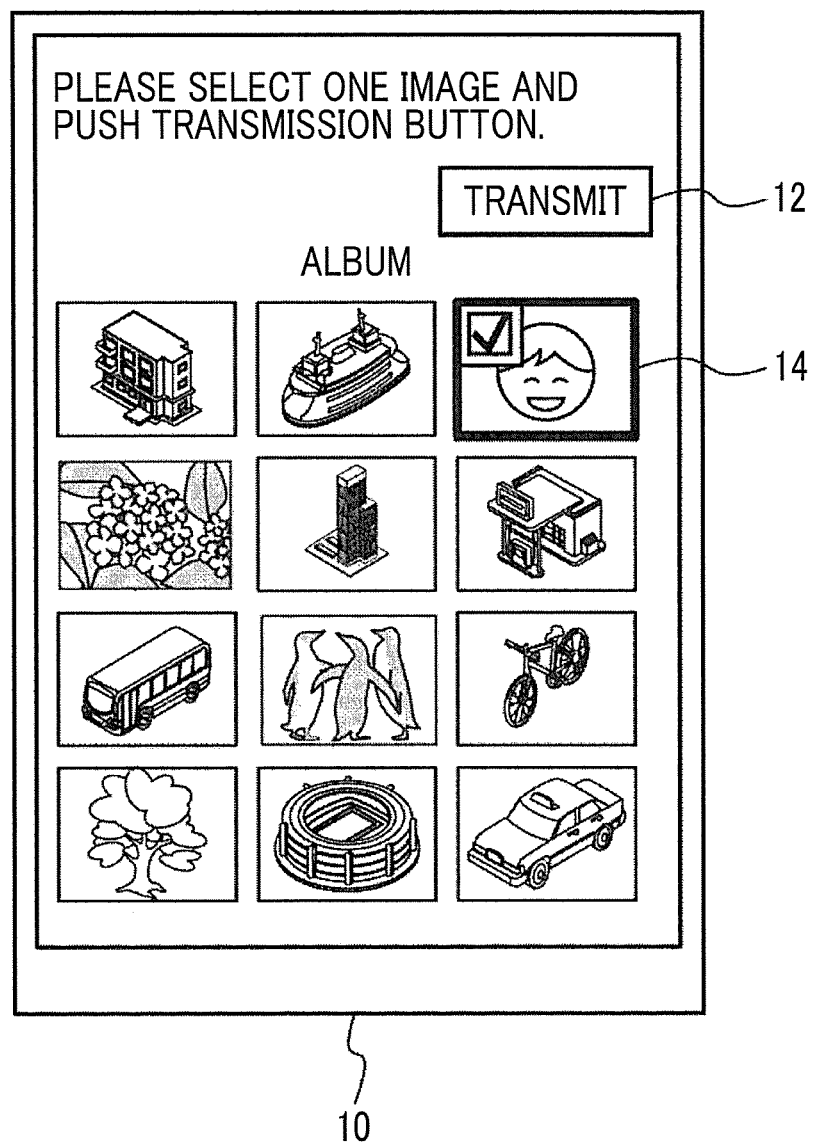
FIG. 11 is a diagram showing an example of an image selection screen in a case where the image management mode is set to mode 1.

FIG. 11 is a diagram showing an example of an image selection screen in a case where the image management mode is set to mode 1. In a case where the image management mode is set to mode 1, only an image selected last is selected as an image to be posted to the talk room even though the user selects a plurality of images. In a case where the selected image is selected again, the selection state is released. In the example shown in FIG. 11, only an image displayed in a region 14 selected last is in a selection state, and the image in the selection state is posted to the talk room by pressing a transmission button 12 by the user.

In addition, for example, the thickness or the color of the edge of an image in a selection state may be displayed so as to be different from the thickness or the color of the edge of an image in a non-selection state so that the image in the selection state and the image in the non-selection state are distinguished from each other on the image selection screen. A check mark may be displayed on the image in the selection state.

Figure 12:
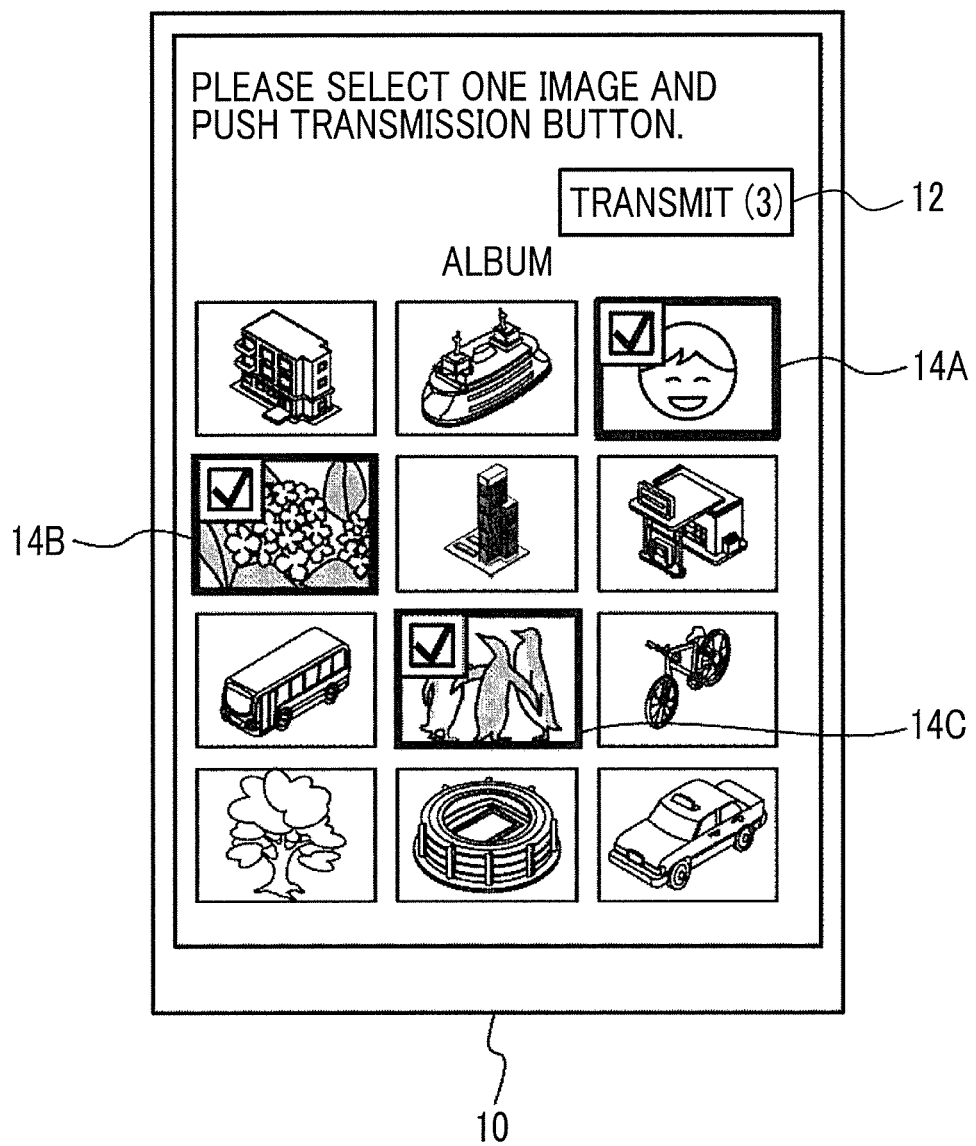
FIG. 12 is a diagram showing an example of an image selection screen in a case where the image management mode is set to mode 2.

On the other hand, FIG. 12 is a diagram showing an example of the image selection screen in a case where the image management mode is set to mode 2. In a case where the image management mode is set to mode 2, a plurality of images are selected as images to be posted to the talk room. In the example shown in FIG. 12, images displayed in regions 14A, 14B, and 14C are in a selection state, and each image in the selection state is posted to the talk room by pressing the transmission button 12 by the user.

For example, the number of images in the selection state may be displayed on the transmission button 12 to notify the user of the number of selected images. In a case where the upper limit value is set as the number of images to be collectively managed, for example, the upper limit value may be displayed on the transmission button 12 as "(3/10)". In this example, the numerator represents the number of images in a selection state, and the denominator represents the upper limit value of images to be collectively managed.

In a case where images are selected beyond the upper limit value, a warning message may be displayed on the image selection screen. In addition, in a case where the number of selected images reaches the upper limit value, a display notifying that no more images can be selected may be displayed on the image selection screen.

The screen displayed on the user terminal 10 is generated by the control device 30, and the user terminal 10 downloads and displays the screen generated by the control device 30. The control device 30 receives the content of the screen operation by the user, and performs screen switching or display change according to the operation. However, the user terminal 10 may activate an application downloaded from the control device 30 or the talk room server 20 to display a screen, and the user terminal 10 may change the screen or operation processing according to the user's operation content and the instruction from the control device 30 according to the image management mode.

Although the case where the control device 30 receives an image in the talk room has been described so far, the operation of the control device 30 in a case where identification information is received from the image forming apparatus 40 will be described herein.

Figure 13:
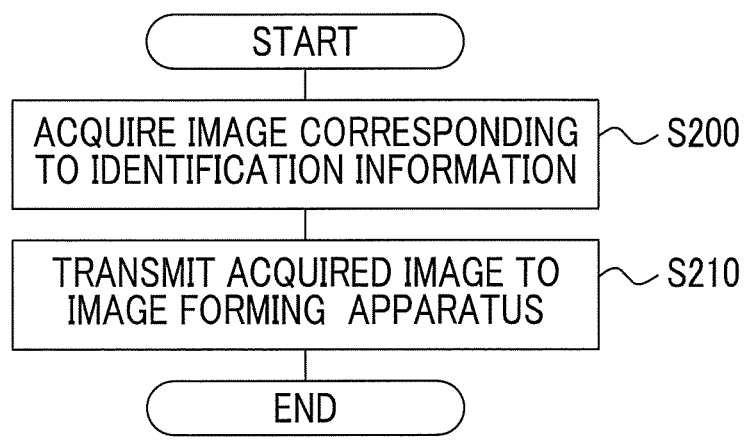
FIG. 13 is a flowchart showing an example of image printing processing.

FIG. 13 is a flowchart showing an example of image printing processing executed by the CPU 31 in a case where identification information is received from the image forming apparatus 40. A control program defining the image printing processing shown in FIG. 13 is stored in advance in the ROM 32 of the control device 30, for example. The CPU 31 of the control device 30 reads the control program stored in the ROM 32 to execute the image printing processing shown in FIG. 13.

In step S200, the CPU 31 acquires an image or an image group, which is managed in association with the received identification information, from the storage 34. In a case where the image associated with the identification information is an image group, a plurality of images are acquired.

In step S210, the CPU 31 transmits the image or the image group acquired in step S200 to the image forming apparatus 40 that has transmitted the identification information, and ends the image printing processing shown in FIG. 13. As a result, in the image forming apparatus 40 that has received the image or the image group, printing processing for printing the received image or image group on the recording medium is started.

As an example of the aggregation criteria that define the image aggregation range by the image posting time, in addition to using the posting interval from the image posted immediately before as shown in FIG. 8, a posting interval from an image received from the initial state in which images managed together are not yet posted, that is, a posting interval from the reception of the first image may be used.

Figure 14:
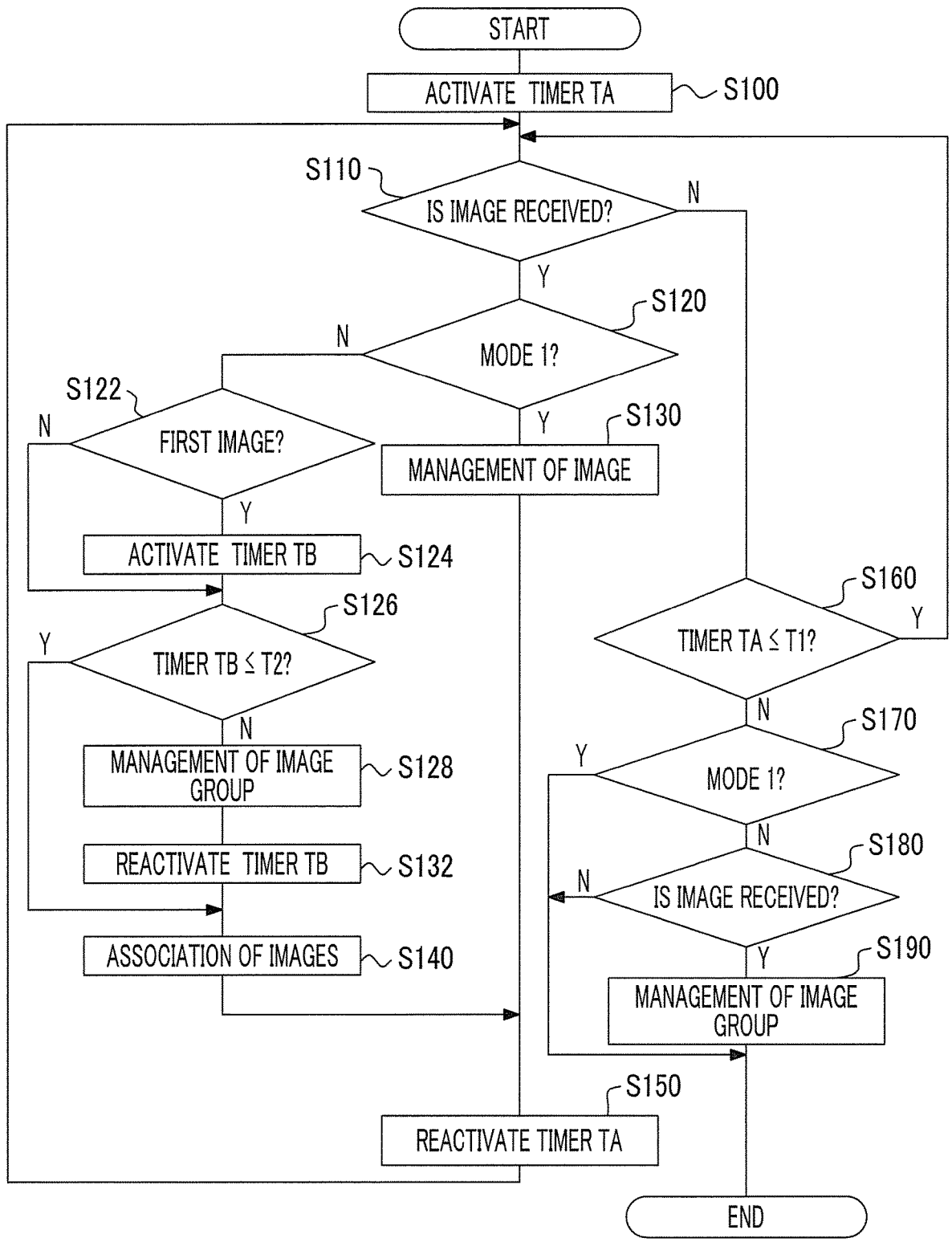
FIG. 14 is a flowchart showing an example of image management processing for determining the image aggregation range according to the posting interval from the reception of the first image.

FIG. 14 is a flowchart showing an example of image management processing for determining the image aggregation range according to the posting time from the reception of the first image.

The image management processing shown in FIG. 14 is executed after the image management mode setting processing shown in FIG. 7 is performed. A control program defining the image management processing shown in FIG. 14 is stored in advance in the ROM 32 of the control device 30, for example. The CPU 31 of the control device 30 reads the control program stored in the ROM 32 to execute the image management processing shown in FIG. 14.

The image management processing shown in FIG. 14 is the same as the image management processing shown in FIG. 8 except that steps S122 to S128 and step S132 are added.

In a case where it is determined that the image management mode is mode 2 in the determination processing of step S120, the process proceeds to step S122.

In step S122, the CPU 31 determines whether or not the received image is the first image. In a case where the received image is the first image, the process proceeds to step S124. In step S124, the CPU 31 activates a timer TB and then proceeds to step S126. The timer TB is a timer that measures an elapsed time from the reception of the first image, and is a timer different from the timer TA. A time T2 is set by the user who performs posting for designating the value of the time T2, and is stored in the storage 34.

On the other hand, in a case where it is determined in the determination processing of step S122 that the received image is not the first image but an image received after an image for which the range to be managed is not yet determined, the process proceeds to step S126 without executing the processing of step S124.

In step S126, the CPU 31 determines whether or not the value of the timer TB is equal to or less than the time T2.

The time T2 is a value indicating the upper limit time of a waiting time for waiting for reception of another image after the first image is received, and is stored, for example, in the storage 34 in advance. The time T2 is set to be shorter than the time T1, and the CPU 31 performs control to manage each image received within the time T2 together with the first image.

In a case where the received image is an image received after the time T2 has passed from the posting time of the first image, the process proceeds to step S128. In step S128, the CPU 31 sets the first image and each image received within the time T2 to one image group, and generates identification information for the image group. Since the range of images to be managed is determined in this manner, the state returns to the initial state in which images to be collectively managed have not been posted yet.

That is, the headmost image received after the value of the timer TB exceeds the time T2 becomes a new first image. Accordingly, in order to generate a new image group including the first image, the CPU 31 reactivates the timer TB to update the image management target in step S132.

In this case, in step S140, the received image is stored in the RAM 33 as an image included in the new image group.

On the other hand, in a case where it is determined in the determination processing of step S126 that the value of the timer TB at the time of receiving the image is equal to or less than the time T2, the process proceeds to step S140 since the received image is an image to be managed together with the first image.

In this case, in step S140, the received image is stored in the RAM 33 so as to be associated with each of the images posted within the time T2 from the first image.

Each time an image is received, the timer TA is reactivated in step S150. Therefore, in a case where a subsequent image is not received within the time T1 after an image is received, each image received within the time T2 after the first image is received is forcibly collected as one management unit.

In the image management processing shown in FIG. 14, images posted after the time T2 has passed from the first image are collected as a different management unit. However, for example, a situation may occur in which the posting of an image exceeds the time T2 from the first image since it takes time to select the image even though the image is originally intended to be collected as the same image group.

Therefore, in a case where it is determined that the time T2 has passed from the posting of the first image, for example, in step S128, the CPU 31 may post notification information to the talk room in order to notify that the time T2 has passed, and may post inquiry information to the talk room in order to inquire whether or not there are other images to be managed together with the images posted within the time T2 from the posting of the first image.

Figure 15:
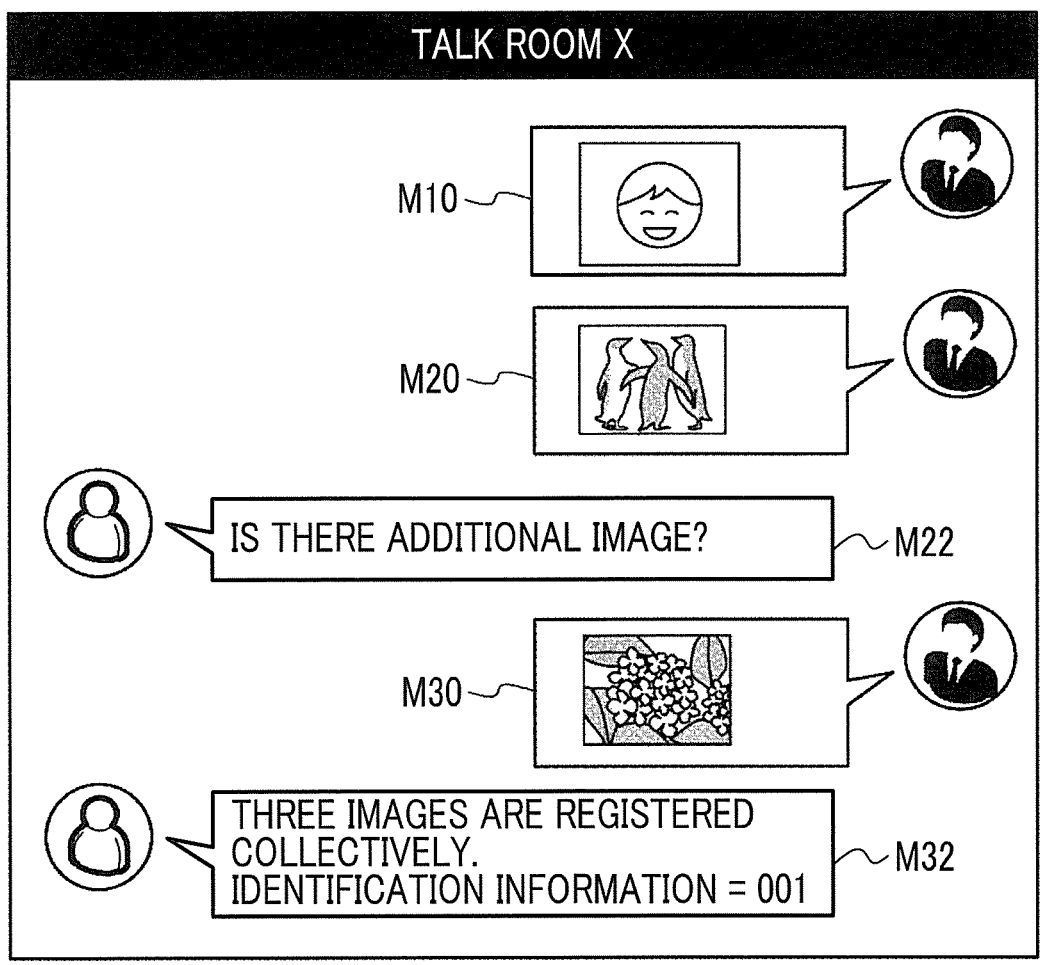
FIG. 15 is a diagram showing an example of a talk room in which a chatbot inquires whether or not there is an image to be added in a case where a predetermined time has passed from the posting of the first image.

FIG. 15 is a diagram showing an example of a talk room in which the chatbot inquires of the user whether or not there is another image to be added in a case where the time T2 has passed from the posting of the first image. In the example shown in FIG. 15, a situation is shown in which the information M20 is posted within the time T2 after the information M10 is posted but the time T2 passes without information being posted thereafter. That is, in a case where each image included in the information M10 and M20 is managed as one image group but the time T2 has passed from the posting of the information M10, the chatbot posts information M22 for inquiring whether or not there is information to be managed by being added to the image group including the images included in the information M10 and M20, such as "Are there any more images to be added?", to the talk room.

After posting the information M22, the control device 30 extends the time to be compared with the elapsed time of the timer TB from the time T2 to time T3 (T2<T3), thereby extending the range of images to be collected as one image group. In a case where the poster of the information M10 and the information M20 posts the information M30 including an image within the time T3 in response to the posting of the information M22, the control device 30 adds the image included in the information M30 to the image group, which includes the images of the information M10 and the information M20, to manage the image. The information M30 is an example of response information notifying that there is information to be managed together with the information group whose management target has already been determined.

The chatbot posts the information M32 to the talk room in order to notify the poster of the image that the image included in the information M30 has also been added to the image group including the images of the information M10 and the information M20.

As described above, the control device 30 according to the present exemplary embodiment has two modes of mode 1 and mode 2 as image management modes. In a case where the image management mode is switched to mode 2, the image aggregation range is determined based on the image posting time, and images in the aggregation range are collectively managed as one image group.

First Modification Example of First Exemplary Embodiment

Although the example of determining the image aggregation range according to the aggregation criteria based on the image posting time, the image aggregation criteria is not limited only to using the time. Hereinafter, the control device 30 that determines the image aggregation range using various methods will be described.

First, an example of the control device 30 that uses delimiter information to designate the image aggregation range will be described. The delimiter information is information indicating the start and end of the image aggregation range, and what kind of information is used as the delimiter information is determined in advance by the control system.

Figure 16:
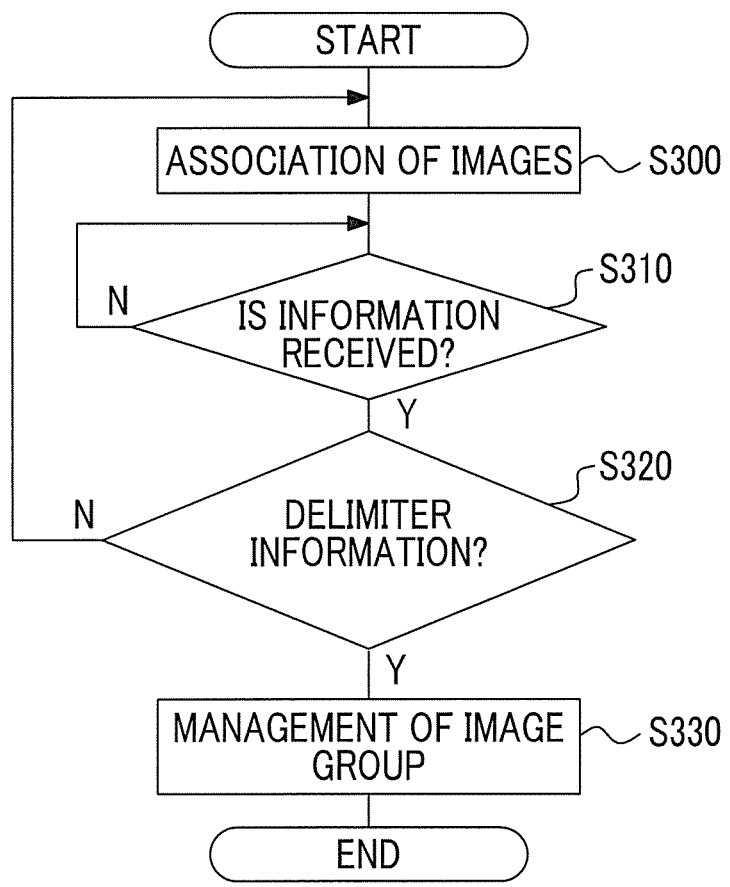
FIG. 16 is a flowchart showing an example of image management processing using delimiter information.

FIG. 16 is a flowchart showing another example of the image management processing executed by the CPU 31 in a case where an image is posted to a talk room. For convenience of explanation, it is assumed that the poster does not post information other than the delimiter information and the image to the talk room.

In step S300, in the same manner as in step S140 of FIG. 8, the CPU 31 stores the posted images in the RAM 33 so as to be associated with each other.

In step S310, the CPU 31 determines whether or not any information has been received subsequent to the images. In a case where no information has been received, the determination processing of step S310 is repeatedly executed to monitor the posting of information to the talk room. On the other hand, in a case where any information is received, the process proceeds to step S320.

In step S320, the CPU 31 determines whether or not the information received in step S310 is delimiter information. In a case where the received information is not delimiter information, that is, in a case where the received information is an image, the process proceeds to step S300 to store the image received in step S310 in the RAM 33 in association with each of the images received so far. On the other hand, in a case where the received information is delimiter information, the process proceeds to step S330.

In step S330, the CPU 31 manages each of the images, which are stored in association with each other in step S300, as one image group, and ends the image management processing shown in FIG. 16.

That is, the CPU 31 manages, as an image aggregation range, a range before the delimiter information is posted from posting of the first image to the talk room. In a case where a plurality of images are included in the image aggregation range, the images are managed in mode 2. In a case where only the first image is present, the image is managed in mode 1.

Figure 17:
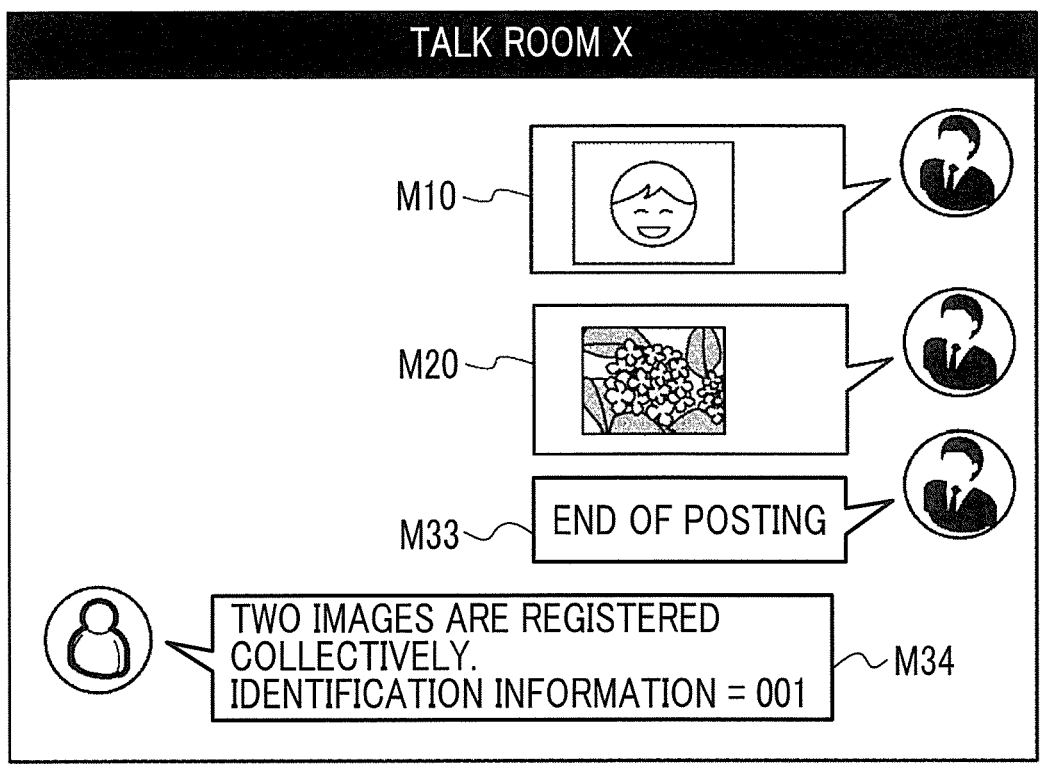
FIG. 17 is a flowchart showing an example of a talk room in a case where image management processing is executed using delimiter information.

FIG. 17 is a diagram showing an example of a talk room in a case where the image management processing shown in FIG. 16 is executed by the control device 30. In the example shown in FIG. 17, "end of posting" is used as the delimiter information. However, the text indicating the delimiter information is not limited to "end of posting". In addition, the delimiter information is not limited to the text, and may be an image.

In a case where the poster of the image posts the delimiter information with the information M33, the chatbot posts, to the talk room, information M34 for notifying that the first image included in the information M10 and the next image included in the information M20, which have been posted to the talk room before the information M33 is posted, have been collectively managed as one image group. As described in FIG. 15, the chatbot may inquire whether there is an image to be added to the image group whose management target has already been determined after the delimiter information is posted.

In the image management processing shown in FIG. 16, the delimiter information is used to indicate the end of the image aggregation range. However, the delimiter information may also be used for the start of the image aggregation range.

Figure 18:
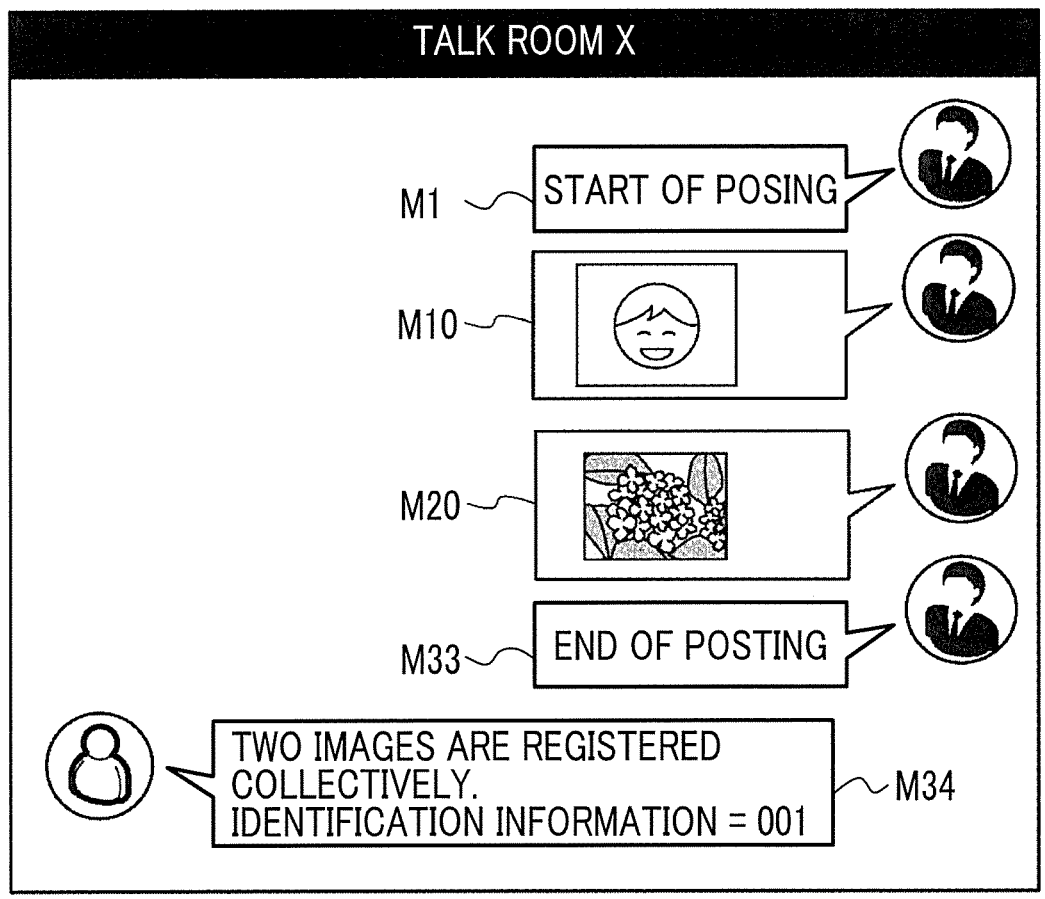
FIG. 18 is a diagram showing an example of a talk room in which images to be collected as one are surrounded by delimiter information.

FIG. 18 is a diagram showing an example of a talk room in which images to be collected as one are surrounded by delimiter information. In the example shown in FIG. 18, "start of posting" is used as delimiter information indicating the start of the image aggregation range. However, the delimiter information indicating the start of the image aggregation range is not limited to "start of posting". In addition, the delimiter information is not limited to the text, and may be an image.

In the case of the example shown in FIG. 18, a range surrounded by the information M1 indicating the start of the image aggregation range and the delimiter information M33 indicating the end of the image aggregation range is set as the image aggregation range, and images included in the aggregation range are collectively managed as one image group. In a case where a plurality of images are included in the image aggregation range, the images are managed in mode 2. In a case where only one image is present, the image is managed in mode 1. That is, even though the mode designation for designating the image management mode is not performed in advance, the image management mode is switched by the posting of delimiter information.

Second Modification Example of First Exemplary Embodiment

Next, an example of the control device 30 that uses the number of image postings to designate the image aggregation range will be described.

Figure 19:
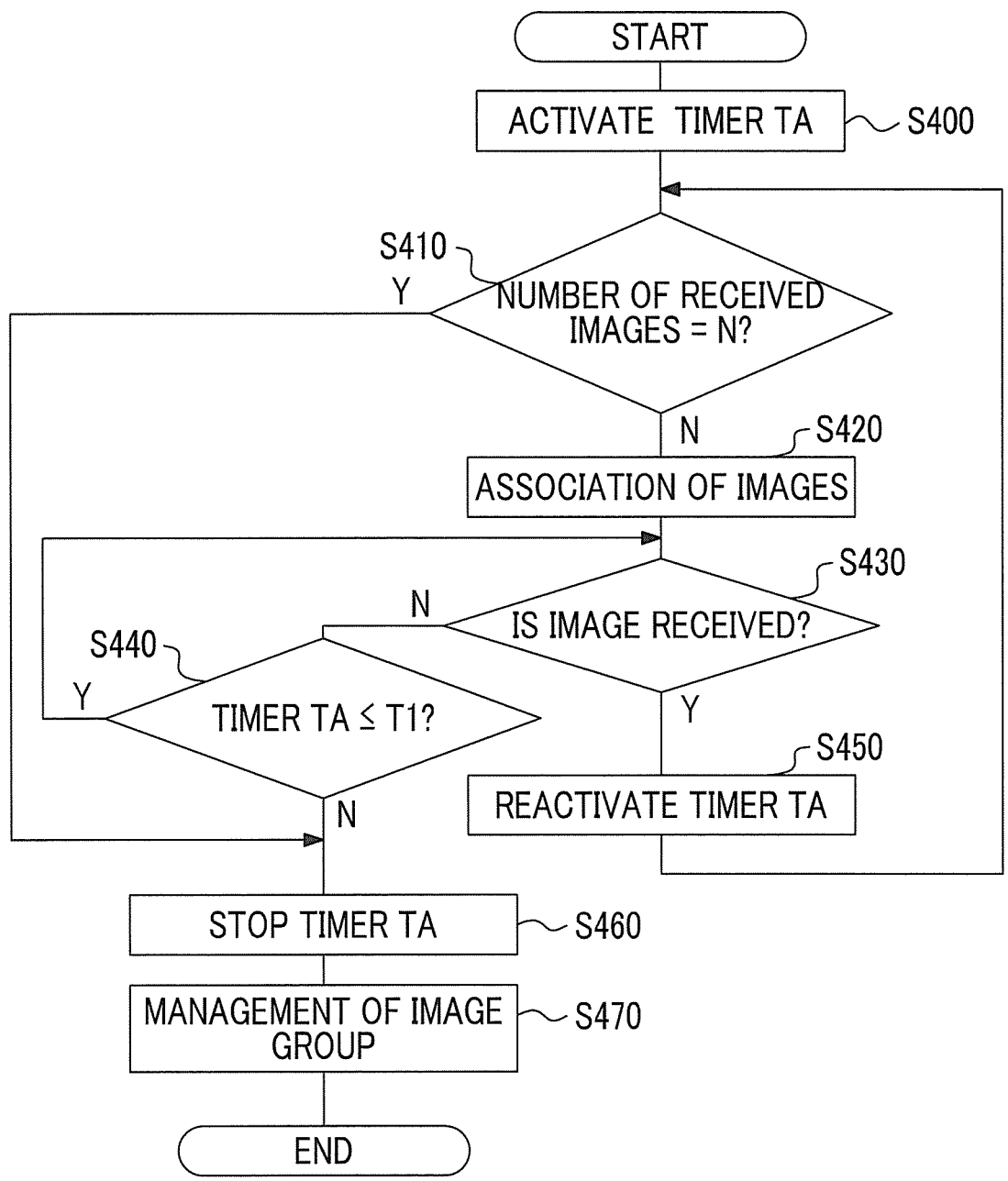
FIG. 19 is a flowchart showing an example of image management processing using the number of image postings.

FIG. 19 is a flowchart showing another example of the image management processing executed by the CPU 31 in a case where an image is posted to a talk room. In the control device 30, a specified number N (N is an integer of 1 or more) for specifying the number of image postings is set in advance and stored, for example, in the storage 34.

In step S400, as in the processing of step S100 in FIG. 8, the CPU 31 activates the timer TA.

In step S410, it is determined whether or not the number of received images has reached the specified number N. In a case where the number of received images has not reached the specified number N, the process proceeds to step S420.

In step S420, as in the processing of step S140 in FIG. 8, the CPU 31 stores the received images in the RAM 33 so as to be associated with each other.

In step S430, the CPU 31 determines whether or not another subsequent image has been received. In a case where another image has been received, the process proceeds to step S450. In step S450, the CPU 31 reactivates the timer TA and then proceeds to step S410.

On the other hand, in a case where it is determined that another image has not been received in the determination processing of step S430, the process proceeds to step S440. In step S440, the CPU 31 determines whether or not the value of the timer TA is equal to or less than the time T1. In a case where the value of the timer TA is equal to or less than the time T1, the process proceeds to step S430. That is, the CPU 31 repeatedly executes each process of steps S410 to S450 until the number of received images reaches the specified number N.

On the other hand, in a case where it is determined that the number of received images has not reached the specified number N in the determination processing of step S410, the process proceeds to step S460.

In step S460, the CPU 31 stops the activated timer TA. In step S470, the CPU 31 manages the images, which are stored so as to be associated with each other in step S420, as one image group, and ends the image management processing shown in FIG. 19.

Also in a case where the value of the timer TA exceeds the time T1 in the determination processing of step S440, it is determined that the posting of images by the poster has ended. Therefore, the CPU 31 executes processing of steps S460 and S470 to end the image management processing shown in FIG. 19.

In a case where a new image is posted after the image management target is determined, the image management processing shown in FIG. 19 is resumed. Therefore, the number of received images and the specified number N are compared with each other in a sequential manner, so that images are managed for each image group including the maximum N images.

Figure 20:
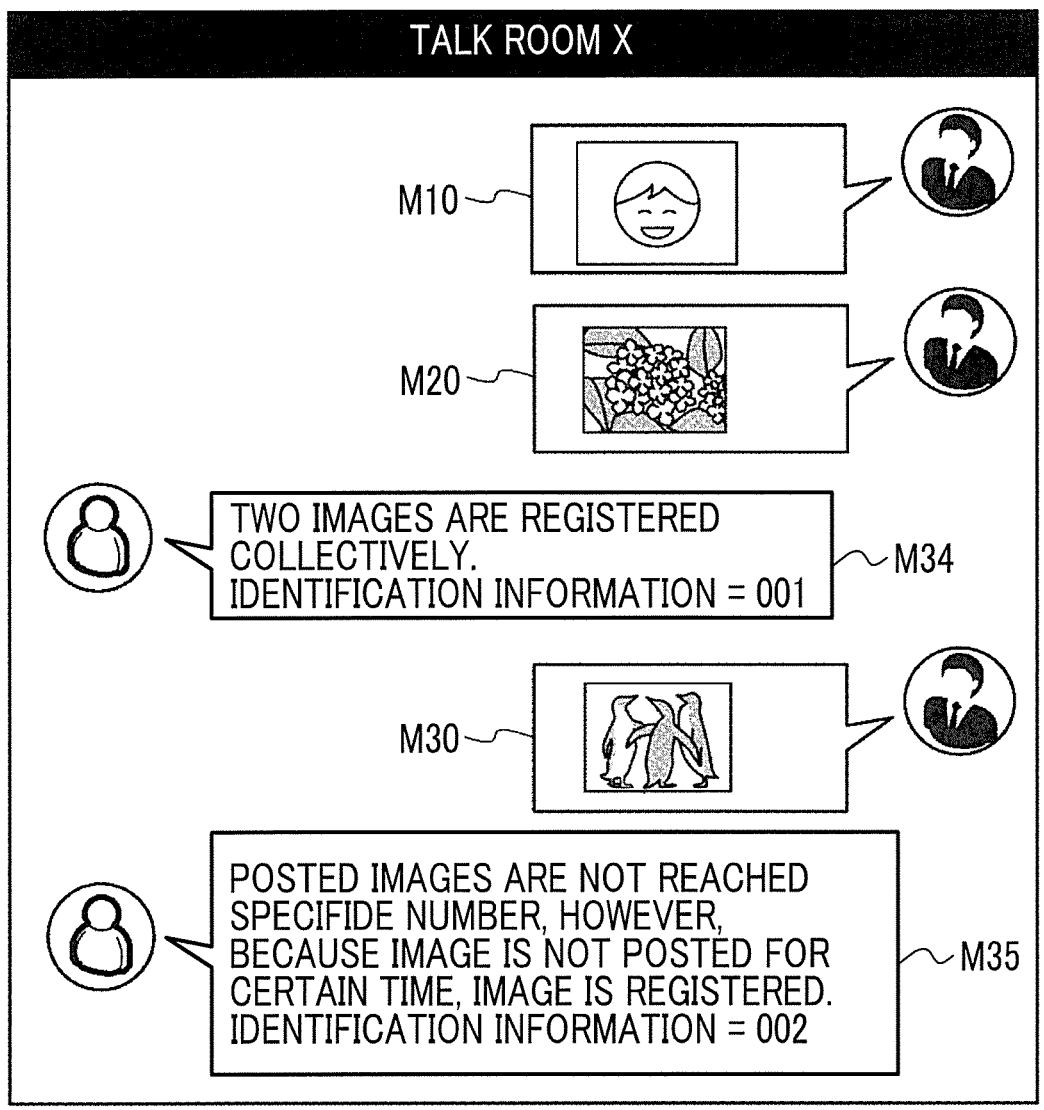
FIG. 20 is a diagram showing an example of a talk room in a case where image management processing is executed using the number of image postings.

FIG. 20 is a diagram showing an example of a talk room in a case where the image management processing shown in FIG. 19 is executed by the control device 30. In the example shown in FIG. 19, the specified number N is set to "2".

Therefore, in a case where the pieces of information M10 and M20 each including an image are posted to the talk room, the control device 30 manages two images collectively, and the chatbot posts, to the talk room, the information M34 for notifying that the two images have been collectively managed as one image group.

Thereafter, since information including another subsequent image is not posted within the time T1 from the posting of the information M30 including an image, even in a case where the number of received images does not reach two, the control device 30 generates identification information with only one image included in the information M30 as a management target.

In this case, although the number of received images has not reached the specified number, the chatbot considers that the posting of an image has ended halfway. Accordingly, the chatbot posts, to the talk room, information M35 for notifying that the images posted so far have been managed as management targets.

In the case of defining the image aggregation range by the number of received images, management of images in mode 1 is performed by setting the specified number N to "1". In a case where the specified number N is set to "2" or more, image management is performed in mode 2. However, management other than mode 2 is not necessarily performed. For example, in a case where only one image is posted, management of images in mode 1 may be performed depending on the situation.

Third Modification Example of First Exemplary Embodiment

Next, an example of the control device 30 that uses the volume of an image to designate the image aggregation range will be described. The volume of an image is also referred to as the data size of the image.

Figure 21:
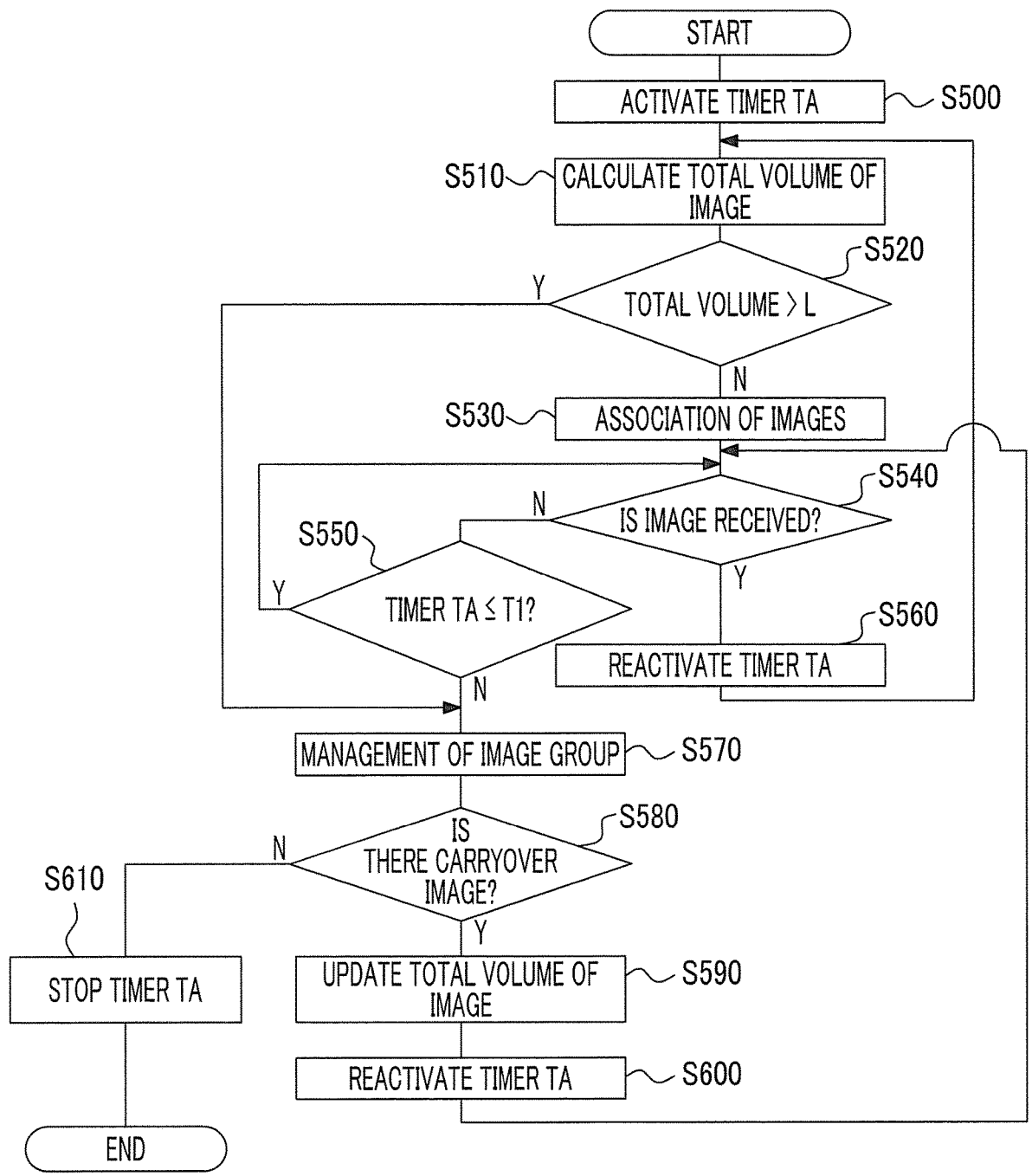
FIG. 21 is a flowchart showing an example of image management processing using the volume of an image.

FIG. 21 is a flowchart showing another example of the image management processing executed by the CPU 31 in a case where an image is posted to a talk room. In the control device 30, a specified volume L (L is a positive real number) for specifying the upper limit volume of images to be collectively managed is set in advance and stored, for example, in the storage 34.

In step S500, as in the processing of step S100 in FIG. 8, the CPU 31 activates the timer TA.

In step S510, the CPU 31 calculates the total volume of the received images. Each time the image management processing shown in FIG. 21 is started, the CPU 31 initializes the total volume of the images to "0" in advance.

In step S520, the CPU 31 determines whether or not the total volume of the images calculated in step S510 exceeds the specified volume L. In a case where the total volume of the images is equal to or less than the specified volume L, the process proceeds to step S530.

In step S530, as in the processing of step S140 in FIG. 8, the CPU 31 stores the received images in the RAM 33 so as to be associated with each other.

In step S540, the CPU 31 determines whether or not another subsequent image has been received. In a case where another image has been received, the process proceeds to step S560. In step S560, the CPU 31 reactivates the timer TA and then proceeds to step S510.

On the other hand, in a case where it is determined that another image has not been received in the determination processing of step S540, the process proceeds to step S550. In step S550, the CPU 31 determines whether or not the value of the timer TA is equal to or less than the time T1. In a case where the value of the timer TA is equal to or less than the time T1, the process proceeds to step S540. That is, the CPU 31 repeatedly executes each process of steps S510 to S560 until the total volume of the received images exceeds the specified volume L.

On the other hand, in a case where it is determined in the determination processing of step S520 that the total volume of the images exceeds the specified volume L due to an image being received, the process proceeds to step S570.

The range in which the total volume of the images is equal to or less than the specified volume L is set as the aggregation range of images to be collectively managed as one image group.

Therefore, in step S570, the CPU 31 separates the received images into the last image (hereinafter, referred to as a "carryover image"), which causes exceeding the specified volume L by being received, and images received before the carryover image is received, and manages an image group, which includes the images received before the carryover image is received, as one management unit.

In step S580, the CPU 31 determines whether or not there is a carryover image. The reason why it is determined whether or not there is a carryover image as described above is that, in a case where it is determined that the timer TA has exceeded the time T1 in the determination processing of step S550, the determination processing of step S580 is executed even though the carryover image is not received.

In a case where there is a carryover image, the process proceeds to step S590 to start management of a new image with the carryover image as the first image.

In step S590, the CPU 31 sets the total volume of the images as the volume of the carryover image, and updates the total volume of the images.

In step S600, as in the processing of step S560, the CPU 31 reactivates the timer TA and then proceeds to step S540. Thereafter, the total volume of the images is updated in step S510 each time a new image is received, and an image group including images received before exceeding the specified volume L is managed as one management unit each time the total volume of the received images exceeds the specified volume L.

In a case where a subsequent image is not posted in a situation in which the total volume of the received images does not exceed the specified volume L and the timer TA exceeds the time T1, it is determined that there is no carryover image in the determination processing of step S580, and the process proceeds to step S610.

In this case, identification information is associated with all the received images, and there are no unmanaged images. Accordingly, in step S610, the CPU 31 stops the timer TA to end the image management processing shown in FIG. 21.

In a case where the first image is an image with a volume exceeding the specified volume L, the specified volume L is exceeded only by one image. In this case, management of images in mode 1 in which only the first image is a management target is performed. That is, even though the mode designation for designating the image management mode is not performed in advance, the control device 30 performs control to switch the image management mode to mode 1 or mode 2 according to the volume of the received image.

Figure 22:
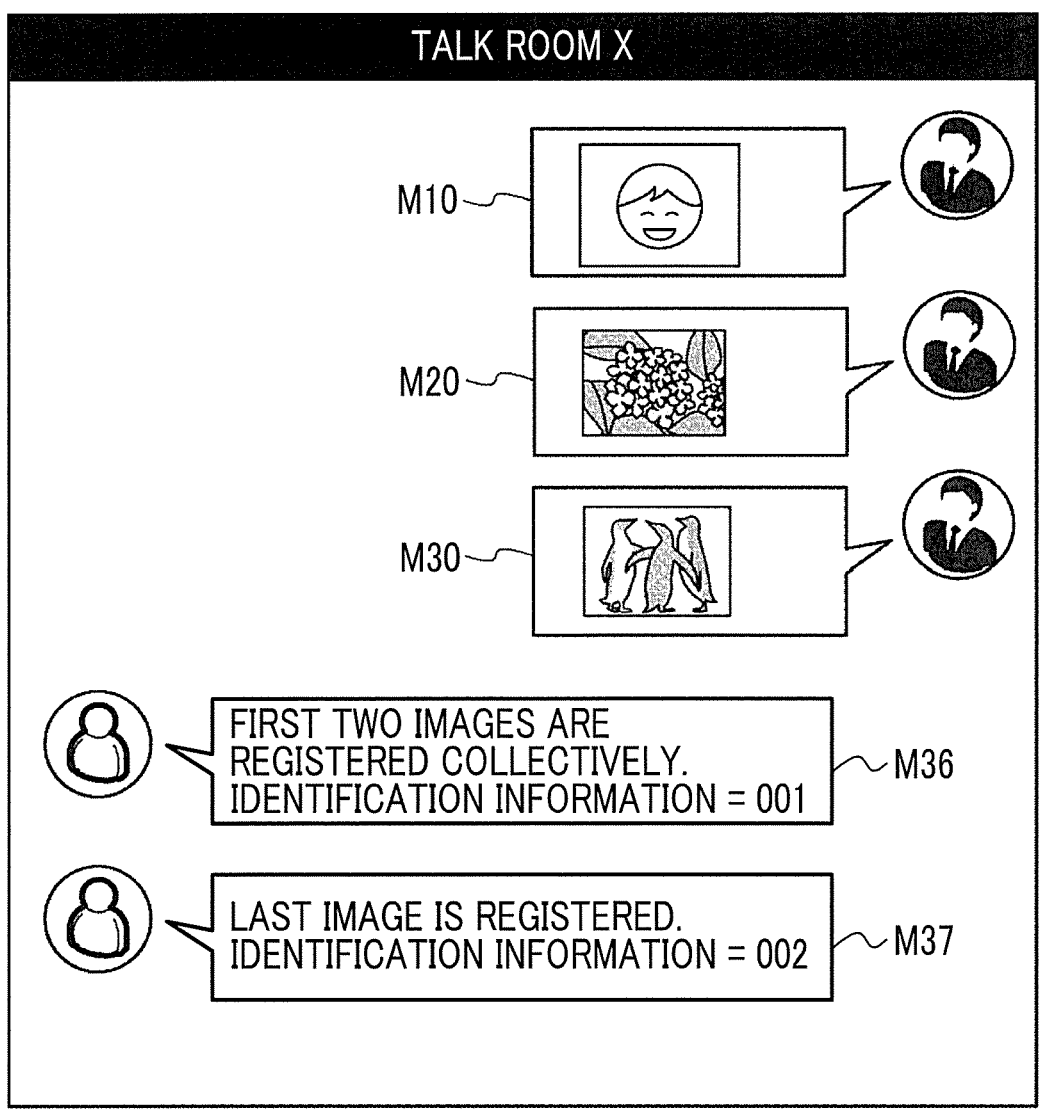
FIG. 22 is a diagram showing an example of a talk room in a case where image management processing is executed using the volume of an image.

FIG. 22 is a diagram showing an example of a talk room in a case where the image management processing shown in FIG. 21 is executed by the control device 30. In the example shown in FIG. 22, a situation is shown in which the total volume of each image included in the information M10 and image included in the information M20 is equal to or less than the specified volume L but the specified volume L is exceeded by adding the volume of the image included in information M30.

Therefore, through the chatbot, the control device 30 posts, to the talk room, information M36 for notifying that the image included in the information M10 and the image included in the information M20 are collectively managed and posts, to the talk room, information M37 for notifying that only the image included in the information M30 is managed as another management unit.

Fourth Modification Example of First Exemplary Embodiment

Next, an example of the control device 30 that determines an image aggregation range according to the form of chat in which a chatbot participates will be described.

Figure 23:
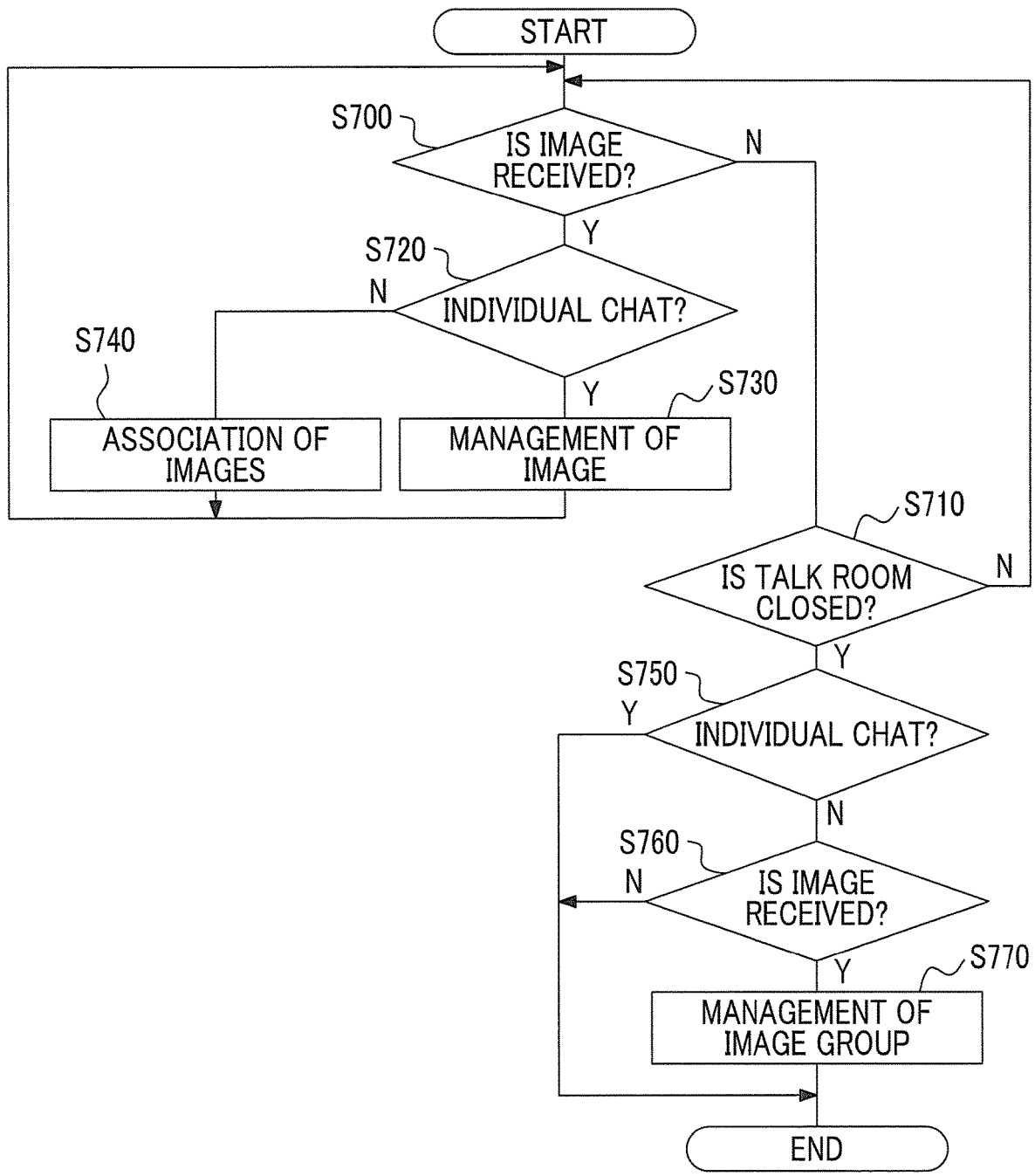
FIG. 23 is a flowchart showing an example of image management processing using the form of a chat.

FIG. 23 is a flowchart showing another example of the image management processing executed by the CPU 31 in a case where the control device 30 is activated.

In step S700, the CPU 31 determines whether or not an image has been received through the talk room. In a case where no image is received, the process proceeds to step S710.

A talk room is opened for the purpose of recording or exchanging information on a common topic, such as a "topic on graduation trip", and is closed in a case where when the talk room is no longer necessary.

Therefore, in step S710, the CPU 31 participates as a chatbot and determines whether or not the talk room waiting for the posting of an image is closed. Closing of the talk room is determined not only by an instruction to close the talk room itself by the setting of the user on the talk room server 20 but also, for example, by the situation in which no image has been posted even though a predetermined time has passed from the posting of the last image or by the posting of information intended to close the talk room, such as "This talk room is not used anymore", to the talk room.

Therefore, the CPU 31 determines whether or not the talk room has been closed by inquiring of the talk room server 20 whether or not the talk room has been closed, or by calculating the elapsed time from the posting time of the last image posted to the talk room, or by checking whether or not information intended to close the talk room has been posted to the talk room.

In the case of a talk room for an issue for which the execution date is fixed, such as a graduation trip, the number of image postings to the talk room may decrease and no one may perform posting to the talk room eventually. Therefore, in the case of a talk room for an issue for which the execution date is fixed, the CPU 31 may determine whether or not the talk room has been closed by calculating an elapsed time from the execution date and comparing the calculated elapsed time with a closing time set in advance as a time at which posting to the talk room is not performed.

In a case where it is determined that the talk room is not closed, the process proceeds to step S700. That is, the CPU 31 monitors the posting of an image to the talk room until the talk room is closed.

In a case where it is determined that an image has been received in the determination processing of step S7000, the process proceeds to step S720.

In step S720, the CPU 31 determines whether or not the form of the chat performed in the talk room is an individual chat. Specifically, the CPU 31 checks the number of users participating in the talk room, and determines that the form of the chat is an individual chat in a case where the number of users participating in the talk room is two including the chatbot and determines that the form of the chat is a group chat in a case where the number of users participating in the talk room is three or more. In a case where the form of the chat is an individual chat, the process proceeds to step S730.

In the case of the individual chat, since no image is posted to the talk room from persons other than the image poster, there is no need to manage the image of the poster together with the images of other users. Therefore, in step S730, the CPU 31 independently manages the received image, and proceeds to step S700 to prepare for reception of the next image.

In a case where it is determined that the form of the chat is a group chat in the determination processing of step S720, the process proceeds to step S740.

In step S740, the CPU 31 stores the received images in the RAM 33 so as to be associated with each other, and proceeds to step S700 to prepare for reception of the next image. That is, in a case where the form of the chat is a group chat, the images posted to the talk room are stored in the RAM 33 so as to be associated with each other.

On the other hand, in a case where it is determined that the talk room has been closed in the determination processing of step S710, the process proceeds to step S750.

In step S750, the CPU 31 determines whether or not the form of the chat is an individual chat. In a case where the form of the chat is a group chat, since the received images are associated with each other in step S740 and association of identification information is not performed, the process proceeds to step S760.

In step S760, as in the processing of step S180 in FIG. 8, the CPU 31 determines whether or not at least one image has been received in the group chat. In a case where at least one image is received, the process proceeds to step S770. In step S770, the CPU 31 manages the images, which are stored so as to be associated with each other in step S740, as one image group, and ends the image management processing shown in FIG. 23.

On the other hand, in a case where it is determined that the form of the chat is an individual chat in the determination processing of step S750 or in a case where it is determined that no image has been received in the group chat in the determination processing of step S760, an image with which identification information is not associated is not present. Therefore, the image management processing shown in FIG. 23 is ended without executing the processing of step S770.

That is, even though the mode designation for designating the image management mode for the control device 30 is not performed in advance, the image management mode is switched according to the chat form in which the chatbot participates. In addition, since a common topic is posted to the talk room, an album including images relevant to the common topic or the like is created by collectively managing the images posted to the talk room as one image group with the closing of the talk room as a trigger.

Alternatively, the control device 30 may switch the image management mode according to the file format of the information posted to the talk room.

For example, in a case where the posted information is an image file, only one image is included in one file in the image file. Therefore, by switching the information management mode to mode 2 for collective management, a plurality of images are printed by one piece of identification information. On the other hand, in a file different from the image file, for example, a document file output by a document creation application, documents are already collected in page units. For this reason, there is less need to manage the documents collectively compared with the image file. Therefore, the control device 30 switches the information management mode to mode 2 in a case where the information posted to the talk room is an image file, and switches the information management mode to mode 1 in a case where the information posted to the talk room is a document file. In order to the file format of information, for example, a file name extension is used.

Alternatively, the control device 30 may switch the image management mode according to the type of recording medium on which the content of information to be posted to the talk room is printed. The information may include an item, which designates the type of recording medium used for printing in the image forming apparatus 40, as a property of the information.

For example, in a case where the information is the content to be printed on a postcard or the address of an envelope, the postcard or the envelope is designated as a recording medium. Therefore, in a case where a postcard or an envelope is designated as the type of recording medium, it is preferable that, for example, the information is not collectively managed so that a plurality of contents addressed to different persons are not printed on one postcard.

On the other hand, in a case where photo paper with little color bleeding and better color development than plain paper is designated as the type of recording medium associated with the information, the information is an image in many cases. In a case where the information is an image, the number of sheets of photo paper used in the case of printing images collectively is smaller than that in the case of printing images individually. For this reason, the printing charge is also reduced in the case of printing images collectively.

Therefore, the information management mode is switched to mode 2 in a case where the photo paper is designated as a recording medium of the information posted to the talk room, and the information management mode is switched to mode 1 in a case where paper other than the photo paper, such as plain paper, a postcard, and an envelope, is designated as a recording medium of the information posted to the talk room.

In each image management processing shown in the present exemplary embodiment, as described with reference to FIG. 15, in a case where the poster of an image gives an instruction to add an image, an image newly posted later may be added to the image group whose aggregation range is already determined for collective management.

The aggregation criteria by which the control device 30 manages images are set, for example, by the user giving an instruction to the control device 30 through the talk room.

Second Exemplary Embodiment

As described in the first exemplary embodiment, the control device 30 collectively manages the information posted to the talk room as a information group according to the image aggregation criteria. From another viewpoint of the information management function, by appropriately setting the information aggregation criteria, information is classified according to the information aggregation criteria. Therefore, in the present exemplary embodiment, the control device 30 that classifies information will be described.

The hardware configuration and the functional configuration of the control device 30 according to the present exemplary embodiment are the same as those in FIGS. 3 and 5.

With reference to an attribute associated with the posted information and attribute conditions, the control device 30 collectively manages information having an attribute satisfying the attribute conditions as one information group, and generates identification information corresponding to each information group. The "attribute associated with information" is an item used for classification of information, and includes an item indicating the feature of information and an item relevant to specific processing executed on information.

Examples of the item indicating the feature of information include information creation date, information update date, information creator, file format of information, the number of texts included in information, the number of colors used to express information, information creation location, and content included in information. Examples of the item relevant to specific processing executed on information include the type of recording medium on which information is printed, in a case where the specific processing is printing processing. The "attribute conditions" are conditions defining how to classify information using the corresponding attribute.

As in the case of the first exemplary embodiment, the following explanation will also be given with an image as an example of information handled by the control device 30.

Figure 24:
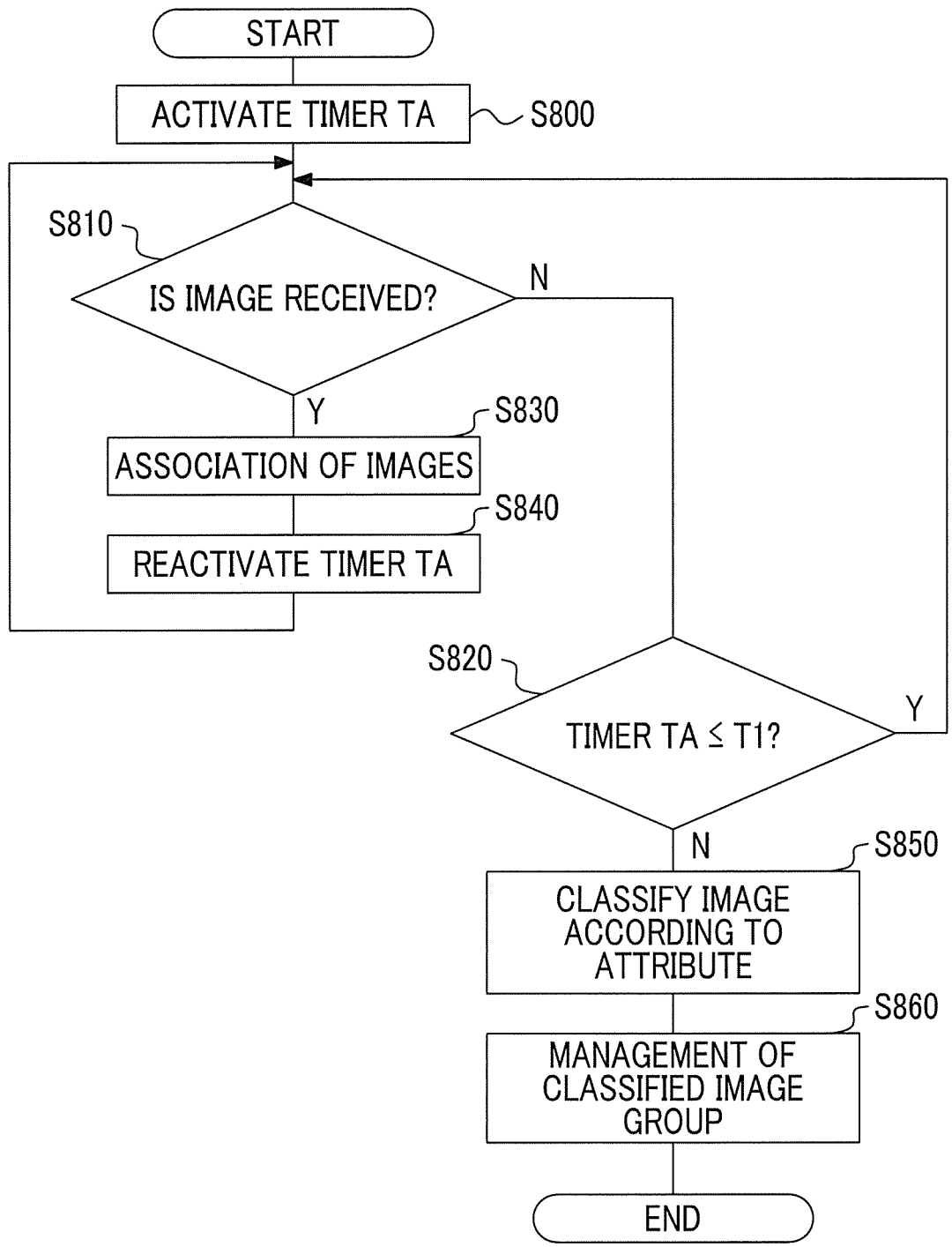
FIG. 24 is a flowchart showing an example of image classification processing using an attribute associated with posted information and attribute conditions.

FIG. 24 is a flowchart showing an example of image classification processing executed by the CPU 31 in a case where the control device 30 is activated. A control program defining the image classification processing shown in FIG. 24 is stored in advance in the ROM 32 of the control device 30, for example. The CPU 31 of the control device 30 reads the control program stored in the ROM 32 to execute the image classification processing shown in FIG. 24.

It is assumed that the image posted to the talk room by the user is, for example, an image stored in a folder of the user terminal 10 without being classified and the attribute associated with an image used for classification of images is set in advance in the control device 30 according to the classification method desired by the user. The attribute associated with the image is set, for example, by posting the attribute, which needs to be used for classification, to the talk room by the user. Here, it is assumed that "image creation date" is set as the attribute associated with the image and conditions, such as "collect the same image" are set as the attribute conditions. An attribute, such as an image creation date, is added to the image as a property of the image.

In step S800, the CPU 31 activates the timer TA for measuring an image posting interval.

In step S810, the CPU 31 determines whether or not an image has been received through the talk room. In a case where no image is received, the process proceeds to step S820. In step S820, the CPU 31 determines whether or not the value of the timer TA is equal to or less than the time T1. In a case where the value of the timer TA is equal to or less than the time T1, the process proceeds to step S810. The CPU 31 monitors the posting of an image to the talk room by the user by repeatedly executing steps S810 and S820 until the value of the timer TA exceeds the time T1.

On the other hand, in a case where an image is received, the process proceeds to step S830. In step S830, the CPU 31 stores the received images in the RAM 33 so as to be associated with each other.

After receiving the image, in step S840, the CPU 31 reactivates the timer TA and then proceeds to step S810. That is, the CPU 31 stores all the images posted within the time T1 from the previous image posting in the RAM 33 so as to be associated with each other.

In a case where the posting of an image to the talk room by the user ends and the value of the timer TA exceeds the time T1 in the determination processing of step S820, the process proceeds to step S850.

In step S850, the CPU 31 refers to the attribute associated with the image and the attribute conditions that are set by the user. In this case, since the attribute associated with the image is "image creation date" and the attribute conditions are "collect the same image", the CPU 31 classifies the plurality of images associated with each other in step S830 into images having the same creation date.

In step S860, the CPU 31 sets each image group classified in step S850 as a management unit, and associates identification information with each management unit to manage these in the storage 34. As described above, the image classification processing shown in FIG. 24 is ended.

That is, in the control device 30, management of images in mode 2 is performed on images having the same creation date, and management of images in mode 1 is performed on images having creation dates different from other images. Since the image management mode in the control device 30 is switched according to the attribute associated with the image and the attribute conditions, the attribute associated with the image and the attribute conditions are also examples of the image aggregation criteria.

In a case where identification information is received from the image forming apparatus 40, the control device 30 transmits an image group, which is managed so as to be associated with the received identification information, to the image forming apparatus 40, which is the transmission source of the identification information, so that the images created on the same day are collectively printed by the image forming apparatus 40.

FIG. 25 is a diagram showing an example of image classification in a case where the image classification processing shown in FIG. 24 is executed by the control device 30. It is assumed that, among eight images A to H, the images A to C are images on the same creation date, the images D and E are images on the same creation date, the images F and G are images on the same creation date, and the image H is an image on the same creation date.

In a case where the images A to H are posted to the talk room, the control device 30 classifies the images A to C as an image group α, the images D and E as an image group β, the images F and G as an image group γ, and the image H as an image group δ, and manages each of the image groups as a management unit. Since only the image H is included in the image group δ, management of images in mode 1 is performed for the image group δ, and management of images in mode 2 is performed for the other image groups.

As described above, the attribute associated with the image and the attribute conditions are changed according to the classification method desired by the user.

For example, even in a case where the attribute associated with the image is the same as "image creation date" as in the above example, different classification is performed by changing the attribute conditions to "collect images within three days" or "collect images created on Saturday".

In a case where the attribute associated with the image is set to "image capturing location" and the attribute conditions are set to "collect images within X km (X is a positive real number)", images captured within a range of X km from the capturing location of each image are collectively managed. The image capturing location can be obtained, for example, by referring to exchangeable image file format (Exif) information added to the image or global positioning system (GPS).

In a case where the attribute associated with the image is set to "content of image" and the attribute conditions are set to "collect images in which the same person appears", images including the same person are collectively managed. Identification of a person or an object shown in an image is performed by referring to a known image recognition technique or tag information that is associated with a subject and indicates who the subject is. In a case where the attribute conditions are changed, different classifications are performed according to the content of the image, such as an image in which three or more persons appear, an image captured indoors, and an image in which an animal appears.

In the image classification processing shown in the present exemplary embodiment, as described with reference to FIG. 15, in a case where the poster of an image gives an instruction to add an image, an image newly posted later may be added to each classified image group.

Although the present invention has been described with reference to the exemplary embodiments, the present invention is not limited to the scope described in each exemplary embodiment. Various modifications or improvements can be added to each exemplary embodiment within the scope not deviating from the gist of the present invention, and forms after such modifications or improvements are also included in the technical scope of the present invention. For example, the order of processing may be changed without departing from the gist of the present invention.

In the present exemplary embodiment, a form of realizing the image management mode setting processing, the image management processing, the image printing processing, and the image classification processing by software has been described as an example. However, processes equivalent to the flowcharts shown in FIGS. 7, 8, 13, 14, 16, 19, 21, 23, and 24 may be implemented in, for example, an application specific integrated circuit (ASIC), so that the processing by hardware is realized. In this case, the processing speed can be increased compared with a case where each process is realized by software.

In the above exemplary embodiment, a form in which the control program is installed on the ROM 32 has been described. However, the present invention is not limited thereto. The control program according to the exemplary embodiment of the present invention can also be provided in a form stored in a computer readable storage medium. For example, the control program according to the exemplary embodiment of the present invention may be provided in a form recorded on an optical disc, such as a compact disc (CD)-ROM or a digital versatile disc (DVD)-ROM. Alternatively, the control program according to the exemplary embodiment of the present invention may be provided in a form recorded in a semiconductor memory, such as a universal serial bus (USB) memory or a flash memory. Alternatively, the control device 30 may acquire the control program according to the exemplary embodiment of the present invention from an external apparatus connected to the communication line 50 through the communication I/F 37.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device having a first mode in which a plurality of pieces of information posted in a chat are managed for each piece of information and a second mode in which the plurality of pieces of information are collectively managed as one information group, the control device comprising:
a processor, configured to switch between the first and second modes for processing the plurality of pieces of information posted in the chat,
wherein, in the first mode, the processor is configured to perform processing on the plurality of pieces of information posted in the chat individually, and
wherein, in the second mode, the processor is configured to perform processing on the plurality of pieces of information posted in the chat collectively,
wherein, a range designation of information is performed by posting of predetermined delimiter information and a range of the plurality of pieces of information that are posted before the delimiter information and after posting of first information among the plurality of pieces of information is set as a management range of information, and
the processor performs control to set the plurality of pieces of information included in the management range as information management targets in the second mode, and
wherein additional information posted in the chat after the posting of the delimiter information, the processor is further configured to include the additional information in the management range determined by the delimiter information for processing collectively in the chat, wherein the processing includes a printing process for printing the plurality of pieces of information posted in the chat within the management range.

2. The control device according to claim 1, wherein the processor is configured to perform control for switching to the first mode in a case where setting is made not to wait for reception of subsequent information, and to perform control for switching to the second mode in a case where setting is made to wait for reception of subsequent information.

3. The control device according to claim 2, wherein, in a case where control for switching to the second mode is performed, the processor is configured to perform control to update an information management target in the second mode by setting information received within a preset time from reception of the first information as an information management target in the second mode and setting foremost information received exceeding the preset time as the first information.

4. The control device according to claim 3, wherein the processor is configured to perform control to post notification information to the chat in order to notify a poster of information that the preset time has passed in a case where an elapsed time from reception of the first information exceeds the preset time and extend the preset time in a case where response information notifying that information to be collectively managed as one information group is still present is posted from the poster of the information as a response to the notification information.

5. The control device according to claim 1,
Wherein the management range of information is further defined by another delimiter information which is posted prior to the first information among the plurality of pieces of information in the chat, and the processor is further configured to determine the plurality of pieces of information in the chat between the other delimiter information and the delimiter information as the management range in which the plurality of information are processed collectively in the second mode.

6. The control device according to claim 1, wherein the processor is configured to switch between the first mode and the second mode based on a number of information selected in a selection screen, wherein the selection screen is displayed on the information apparatus operated by a poster of information.

7. A non-transitory computer readable medium storing a control program causing a computer to function as:
the processor of the control device according to claim 1.

8. The control device according to claim 1, wherein the processor notifies a poster that the plurality of pieces of information are managed as one information group by posting post information in the chat.

\* \* \* \* \*